United States Patent
Sudoh

(10) Patent No.: US 9,297,988 B2
(45) Date of Patent: Mar. 29, 2016

(54) ZOOM LENS AND DEVICE HAVING ZOOM LENS

(71) Applicant: Yoshifumi Sudoh, Tokyo (JP)

(72) Inventor: Yoshifumi Sudoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/480,816

(22) Filed: Sep. 9, 2014

(65) Prior Publication Data

US 2015/0070780 A1    Mar. 12, 2015

(30) Foreign Application Priority Data

Sep. 11, 2013  (JP) ................................ 2013-188250

(51) Int. Cl.
*G02B 15/14* (2006.01)
*G02B 9/34* (2006.01)
(Continued)

(52) U.S. Cl.
CPC . *G02B 15/14* (2013.01); *G02B 3/14* (2013.01); *G02B 5/005* (2013.01); *G02B 9/34* (2013.01);
(Continued)

(58) Field of Classification Search
CPC ........ G02B 13/009; G02B 13/18; G02B 9/34; G02B 15/14; G02B 15/167; G02B 13/002; G02B 15/24; G02B 3/14; G02B 5/005; H04N 5/23296
USPC .......... 359/683–687, 715, 737, 740, 742, 774
See application file for complete search history.

(56) References Cited

U.S. PATENT DOCUMENTS 5,268,790 A * 12/1993 Chen ...................... G02B 15/16
                                                    359/558

5,717,525 A *  2/1998 Estelle ................... G02B 15/14
                                                    359/677

(Continued)

FOREIGN PATENT DOCUMENTS

JP          11-311743         11/1999
JP          2004-245951        9/2004

(Continued)

OTHER PUBLICATIONS

U.S. Appl. No. 14/445,408, filed Jul. 29, 2014.

*Primary Examiner* — Evelyn A Lester

(74) *Attorney, Agent, or Firm* — Oblon, McClelland, Maier & Neustadt, L.L.P.

(57) ABSTRACT

A zoom lens includes, in order from an object side toward an image side: a first lens unit having a positive refractive power and provided with a positive lens; a second lens unit having a negative refractive power; a third lens unit having a positive refractive power and provided with a diffraction plane of a diffraction optical element; a fourth lens unit having a positive refractive power to perform focusing; and an aperture stop between the second lens unit and the third lens unit. According to a change of magnification from a short focal end to a long focal end, the first lens unit is stationary, the second lens unit is moved to the image side, the third lens unit is moved to the object side, and the fourth lens unit is moved, and the positive lens satisfies the following condition formulas:

$$1.45 < n_d < 1.65;$$ [1]

$$60.0 < v_d < 95.0; \text{ and}$$ [2]

$$0.005 < P_{g,F} - (-0.001802 \times v_d + 0.6483) < 0.050$$ [3]

11 Claims, 18 Drawing Sheets

(51) Int. Cl.
  *G02B 5/00* (2006.01)
  *G02B 15/167* (2006.01)
  *G02B 13/00* (2006.01)
  *G02B 3/14* (2006.01)
  *G02B 13/18* (2006.01)
  *H04N 5/232* (2006.01)

(52) U.S. Cl.
  CPC ............ *G02B 13/002* (2013.01); *G02B 13/009* (2013.01); *G02B 13/18* (2013.01); *G02B 15/167* (2013.01); *H04N 5/23296* (2013.01)

(56) References Cited

U.S. PATENT DOCUMENTS

| | | | |
|---|---|---|---|
| 5,872,658 A * | 2/1999 | Ori | G02B 15/173 359/565 |
| 7,372,636 B2 | 5/2008 | Sudoh | |
| 7,535,653 B2 | 5/2009 | Sudoh | |
| 7,545,577 B2 * | 6/2009 | Hamano | G02B 15/173 359/568 |
| 7,583,449 B2 * | 9/2009 | Kusaka | G02B 15/173 359/686 |
| 7,623,298 B2 | 11/2009 | Sudoh | |
| 7,636,201 B2 | 12/2009 | Sudoh et al. | |
| 7,719,773 B2 | 5/2010 | Atsuumi et al. | |
| 7,864,443 B2 | 1/2011 | Sudoh et al. | |
| 7,869,143 B2 | 1/2011 | Sudoh | |
| 7,961,365 B2 | 6/2011 | Nishina et al. | |
| 8,018,663 B2 | 9/2011 | Ohashi et al. | |
| 8,139,297 B2 | 3/2012 | Sudoh | |
| 8,284,501 B2 | 10/2012 | Sudoh | |
| 8,379,329 B2 | 2/2013 | Nakayama et al. | |
| 8,405,917 B2 | 3/2013 | Sudoh | |
| 2010/0296180 A1 | 11/2010 | Sudoh et al. | |
| 2011/0228408 A1 | 9/2011 | Sudoh | |
| 2012/0127586 A1 | 5/2012 | Sudoh | |
| 2014/0293457 A1 | 10/2014 | Sudoh | |

FOREIGN PATENT DOCUMENTS

| | | |
|---|---|---|
| JP | 2008-197533 | 8/2008 |
| JP | 2012-128033 | 7/2012 |

* cited by examiner

ZOOM LENS AND DEVICE HAVING ZOOM LENS

CROSS-REFERENCE TO RELATED APPLICATIONS

This patent application is based on and claims priority pursuant to 35 U.S.C. §119(a) to Japanese Patent Application No. 2013-188250, filed on Sep. 11, 2013, in the Japan Patent Office, the entire disclosure of which is hereby incorporated by reference herein.

BACKGROUND

1. Technical Field

The present invention relates to a zoom lens, and a device having the zoom lens as an photographing optical system such as a camera and a portable information terminal device.

2. Description of the Related Art

Market of cameras used for security and the like is widened, and demands thereof are also increased in various fields. Especially, with the demands for high image quality and high magnification changeability, in the zoom lens used as a photographing lens, the reconciliation of high performance with high magnification changeability has been desired.

Herein, in terms of high performance, a configuration having a resolving power corresponding to imaging elements of at least 1 mega to 5 mega pixels over the entire zoom range is desirable. It is also considered that a magnification changing ratio of about X20 is needed as the high magnification changeability.

In addition, it is preferable that aberrations be sufficiently corrected even in a near infrared wavelength range so that photographing is available even in a dark state. Further, widening of an angle of view is preferred, and preferably, a half angle of view at a short focal end of a zoom lens is about 30 degrees or more. In addition, a large diameter of a lens is preferred, and preferably, an F number at a short focal end (sometimes, referred to as "wide angle") is 2.0 or less.

As a type capable of securing a magnification changing ratio of about X20 and suitable for a large diameter of a lens, there has been developed a zoom lens including a first lens unit having a positive refractive power, a second lens unit having a negative refractive power, a third lens unit having a positive refractive power, and a fourth lens unit having a positive refractive power.

However, none of the zoom lenses satisfies conditions of an F number of 2.0 or less at a short focal end, a magnification changing ratio of about X20, and an F number of 2.0 or more at a long focal end (telephoto end), while achieving a small size and correction of aberration in a near infrared range.

SUMMARY

According to an aspect of the present invention, there is provided a zoom lens including, in order from an object side toward an image side: a first lens unit having a positive refractive power and provided with a positive lens; a second lens unit having a negative refractive power; a third lens unit having a positive refractive power and provided with a diffraction plane of a diffraction optical element; a fourth lens unit having a positive refractive power and configured to perform focusing; and an aperture stop installed between the second lens unit and the third lens unit. According to a change of magnification from a short focal end to a long focal end, the first lens unit is stationary, the second lens unit is moved to the image side, the third lens unit is moved to the object side, and the fourth lens unit is moved.

The positive lens satisfies the following condition formulas:

$$1.45 < n_d < 1.65; \qquad [1]$$

$$60.0 < v_d < 95.0; \text{ and} \qquad [2]$$

$$0.005 < P_{g,F} - (-0.001802 \times v_d + 0.6483) < 0.050, \qquad [3]$$

in which, $n_d$ denotes a refractive index of a material of the positive lens, $v_d$ denotes an Abbe number of the material of the positive lens, and $P_{g,F}$ denotes a partial dispersion ratio of the material of the positive lens, which is expressed by: $P_{g,F} = (n_g - n_F)/(n_F - n_C)$, with $n_F$, $n_C$, and $n_g$ denoting refractive indexes of F-line, C-line, and g-line of the material of the positive lens, respectively, and the partial dispersion ratio $P_{g,F}$.

BRIEF DESCRIPTION OF THE SEVERAL VIEWS OF THE DRAWINGS

FIG. 1(a) is a cross-sectional diagram at a short focal end (wide-angle end) along an optical axis, FIG. 1(b) is a cross-sectional diagram at an intermediate focal length along the optical axis, and FIG. 1(c) is a cross-sectional diagram at a long focal end (telephoto end) along the optical axis;

FIG. 5(a) is a cross-sectional diagram at a short focal end along an optical axis, FIG. 5(b) is a cross-sectional diagram at an intermediate focal length along the optical axis, and FIG. 5(c) is a cross-sectional diagram at a long focal end along the optical axis.

FIG. 9(a) is a cross-sectional diagram at a short focal end along an optical axis, FIG. 9(b) is a cross-sectional diagram at an intermediate focal length along the optical axis, and FIG. 9(c) is a cross-sectional diagram at a long focal end along the optical axis;

FIG. 13(a) is a cross-sectional diagram at a short focal end along an optical axis, FIG. 13(b) is a cross-sectional diagram at an intermediate focal length along the optical axis, and FIG. 13(c) is a cross-sectional diagram at a long focal end along the optical axis.

DETAILED DESCRIPTION

Figure 1:
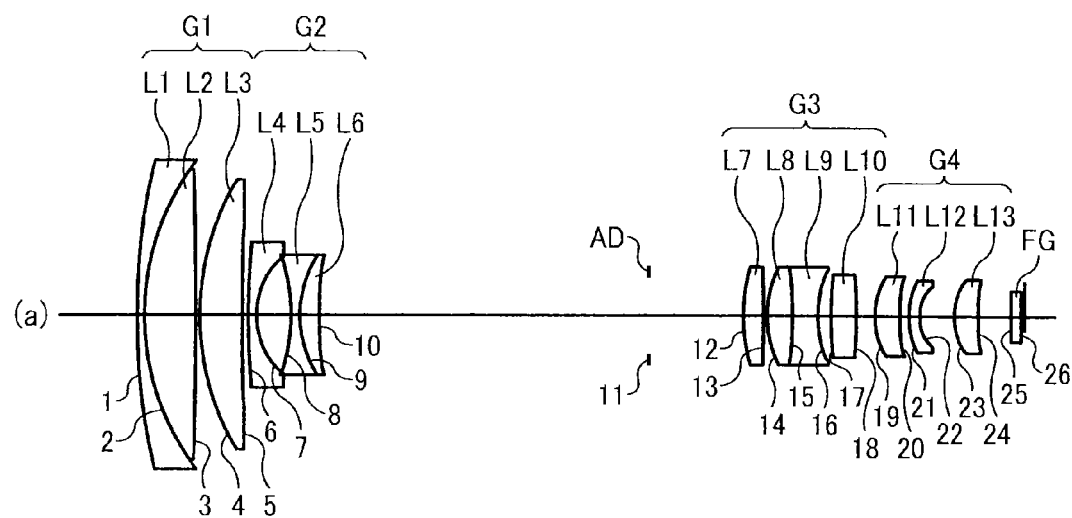
FIG. 1 is a schematic diagram illustrating a configuration of an optical system and a zoom locus involved with zooming of a zoom lens according to Example 1 of a first embodiment of the present invention.
Figure 1:
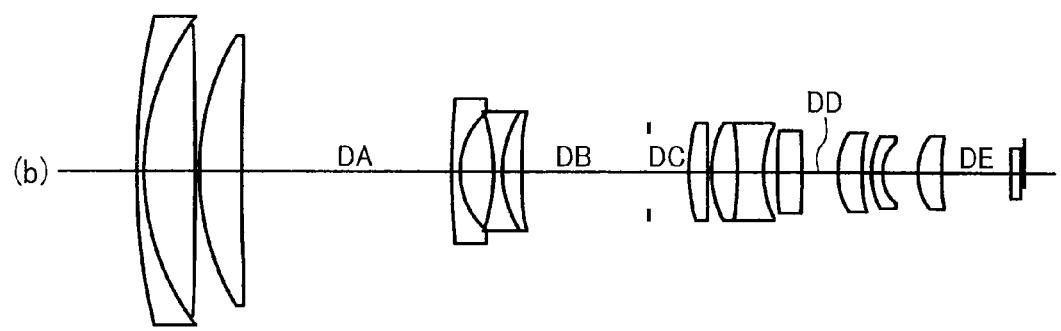
Figure 1:
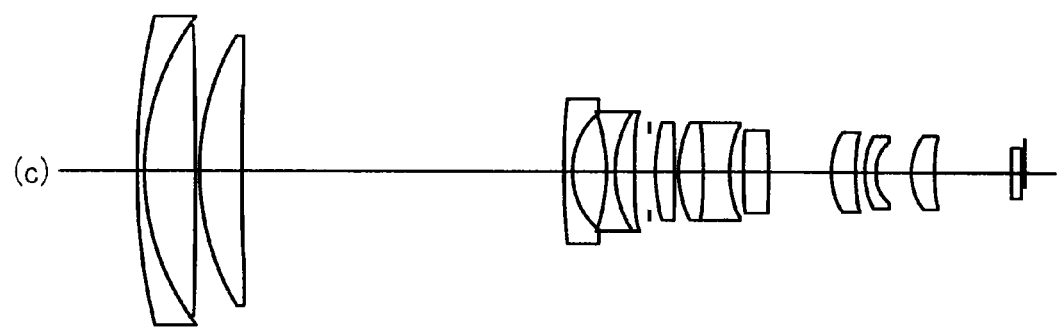

Hereinafter, zoom lenses, and devices having the zoom lenses such as cameras and portable information terminal devices according to embodiments of the present invention will be described in detail with reference to the drawings.

Before description of specific examples, firstly, an elementary embodiment of the present invention will be described.

In the present invention, a first lens unit having a positive refractive power, a second lens unit having a negative refractive power, a third lens unit having a positive refractive power, and a fourth lens unit having a positive refractive power are arranged in order from an object side. In other words, a zoom lens configured with four lens units of positive-negative-positive-positive lens units is configured as a so-called variator where the second lens unit performs a main magnification changing function.

In the zoom lens, during the change of magnification from the short focal end to the long focal end, the first lens unit is stationary, the second lens unit is moved to the image side, the third lens unit is moved to the object side, and the fourth lens unit is moved, so that the distance between the first lens unit and the second lens unit is increased, and the distance between the second lens unit and the third lens unit is deceased.

In addition, in order to correct chromatic aberration in a near infrared wavelength range, it is preferable that a diffraction plane be used. If the diffraction plane is used for the first lens unit, correction of axial chromatic aberration at the long focal end is very effectively performed. However, since light beams at various incident angles are incident on the diffraction plane of the first lens unit, flare easily occurs. For this reason, use of the diffraction plane for the third lens unit is preferable to use of the diffraction plane for the first lens unit.

The third lens unit may correct substantially the same amount of axial chromatic aberration in the entire zoom range. Although the axial chromatic aberration at the long focal end is likely to be a problem, in a zoom lens where the F number at the short focal end is small, sufficient correction of the axial chromatic aberration at the short focal end is needed, and the effect by the diffraction plane may be desired.

In addition, in order to correct the axial chromatic aberration at the long focal end, the configuration where the first lens unit includes a positive lens satisfying the following condition formulas [1], [2], and [3] is preferred.

$$1.45 < n_d < 1.65 \quad [1]$$

$$60.0 < v_d < 95.0 \quad [2]$$

$$0.005 < P_{g,F} - (-0.001802 \times v_d + 0.6483) < 0.050 \quad [3]$$

Herein, $n_d$ denotes a refractive index of the positive lens included in the first lens unit, $v_d$ denotes an Abbe number of the positive lens included in the first lens unit, and $P_{g,F}$ denotes a partial dispersion ratio of the positive lens included in the first lens unit.

Herein, $P_{g,F} = (n_g - n_F)/(n_F - n_C)$, and $n_g$, $n_F$, and $n_C$ denote refractive indexes of the positive lens with respect to g-line, F-line, and C-line.

If the condition formulas [1], [2], and [3] are satisfied, it is possible to sufficiently correct the axial chromatic aberration at the long focal end.

If the value is smaller than the lower limit of the condition formula [1], the monochromatic aberration is not sufficiently corrected. If the value is smaller than the lower limit of the condition formula [2], the chromatic aberration is not sufficiently corrected. If the value is smaller than the lower limit of the condition formula [3], the second-order spectrum of the chromatic aberration is not sufficiently corrected. On the other hand, no optical material exceeding the upper limits of all the condition formulas [1], [2], and [3] exists, and even if such an optical material exists, the optical material is very special, expensive, and unreal.

In addition, if focusing is performed by the fourth lens unit, it is possible to perform focusing by using a relatively small lens unit, so that small size, light weight, and energy saving may be achieved. In addition, advantageously, the amount of focusing movement may also become small, and thus, reduction in focusing time may be achieved.

As described above, with the above-described configuration, it is possible to provide a zoom lens having a magnification changing ratio of about X20, a half angle of view of about 30 degrees at the short focal end, an F number of 2.0 or less at the short focal end, an F number of about 2.5 at the long focal end, the number of lens constituents of about 13, a relatively low cost, sufficient correction of aberration in a near IR wavelength range, a small size, and a resolving power corresponding to imaging elements of 2 mega to 5 mega pixels.

In order to achieve higher performance, it is preferable that the following condition formula [4] be satisfied.

$$10 < f3DOE/ft < 50 \quad [4]$$

Herein, f3DOE denotes a focal length of the diffraction plane of the third lens unit, and ft denotes a focal length of the entire system at the long focal end.

A focal length f of the diffraction plane is expressed by $f=-1/(2 \times C2)$. Herein, C2 denotes a coefficient of a second-order term of a phase function.

If the value is larger than the upper limit of the condition formula [4], the focal length of the diffraction plane becomes too long, and thus, the effect of the diffraction plane may not be obtained, so that it is difficult to sufficiently correct the chromatic aberration in a near infrared wavelength range. In addition, if the value is smaller than the lower limit of the condition formula [4], the focal length becomes too short, and thus, the effect of the diffraction plane becomes too excessive, so that it is difficult to sufficiently correct the chromatic aberration, or a too large number of diffraction rings occurs on the diffraction plane, so that the flare is increased.

Preferably, it is preferable that the following condition formula [4'] be satisfied.

$$400 < f3DOE/fw < 800 \quad [4']$$

Herein, fw denotes a focal length at the short focal end, and f3DOE denotes a focal length of the diffraction plane of the third lens unit.

More preferably, it is preferable that the following condition formula [4"] be satisfied.

$$40 < f3DOE/f3 < 100 \quad [4'']$$

Herein, f3 denotes a focal length of the third lens unit, and f3DOE denotes a focal length of the diffraction plane of the third lens unit.

In addition, it is preferable that at least two positive lenses of the first lens unit satisfy the condition formulas [1], [2], and [3].

According to the above-described configuration, it is possible to share the correction of the axial chromatic aberration at the long focal end, and it is possible to sufficiently correct the axial chromatic aberration.

It is preferable that, during the change of magnification from the short focal end to the long focal end, the aperture stop be stationary with respect to the image surface. Accordingly, the configuration leads to simplification of the mechanical structure, so that there is a merit in that a small size of the barrel including the lens is achieved.

In order to achieve higher performance, it is preferable that the following condition formulas [5] to [8] be satisfied.

$$0.70 < f1/ft < 0.90 \quad [5]$$

$$-0.25 < f2/ft < -0.05 \quad [6]$$

$$0.35 < f3/ft < 0.55 \quad [7]$$

$$0.20 < f4/ft < 0.40 \quad [8]$$

Herein, f1 denotes a focal length of the first lens unit, f2 denotes a focal length of the second lens unit, f3 denotes a focal length of the third lens unit, f4 denotes a focal length of the fourth lens unit, and ft denotes a focal length of the entire system at the long focal end.

If the condition formulas [5], [6], [7], and [8] are satisfied, it is possible to achieve a small size, and it is possible to correct various aberrations over the entire zoom range. If the values are smaller than the lower limits of the condition formulas [5] to [8], powers of the lens units become too strong, and it is difficult to correct the aberrations in the unit. In addition, if the values are larger than the upper limits of the condition formulas [5] to [8], there occur problems such as a large size for securing the amount of movement for zooming.

In addition, in order to enable to perform focusing to an object in a near distance and to achieve a small size, it is preferable that the following condition formulas [9] and [10] be satisfied.

$$0.5 < D3\_4w/fw < 0.7 \quad [9]$$

$$0.05 < D3\_4t/ft < 0.25 \quad [10]$$

Herein, D3_4w denotes a distance between the third lens unit and the fourth lens unit at the short focal end, D3_4t denotes a distance between the third lens unit and the fourth lens unit at the long focal end, fw denotes a focal length of the entire system at the short focal end, ft denotes a focal length of the entire system at the long focal end.

If the values are larger than the upper limits of the condition formulas [9] and [10], the distance between the third lens unit and the fourth lens unit becomes too large, and thus, a thickness of other lens units or the distance for the change of magnification is decreased, so that it is difficult to correct various aberrations in the entire range of zoom. In addition, if the values are smaller than the lower limits of the condition formulas [9] and [10], focusing to an object in a near distance may not be enabled, and aberration occurring according to the focusing becomes large.

In addition, in order to achieve high performance and small size, it is preferable that the following condition formula [11] be satisfied.

$$0.4 < (b2t/b2w)/(ft/fw) < 0.6 \quad [11]$$

Herein, b2w denotes a lateral magnification at the short focal end of the second lens unit, b2t denotes a lateral magnification at the long focal end of the second lens unit, ft denotes a focal length of the entire system at the long focal end, and fw denotes a focal length of the entire system at the short focal end.

If the value is larger than the upper limit of the condition formula [11], the change of magnification of the second lens unit becomes too large, and thus, the focal length of the second lens unit becomes too small, and the amount of movement of the second lens unit is increased, so that it is difficult to correct the aberrations in the entire zoom range. In addition, if the value is smaller than the lower limit of the condition formula [11], the change of magnification of the second lens unit becomes too small, so that it is difficult to correct the aberrations in the entire zoom range.

In order to achieve higher performance and small size, it is preferable that the following condition formula [12] be satisfied.

$$0.3 < m2/TL < 0.4 \quad [12]$$

Herein, m2 denotes an amount of movement of the second lens unit during change of magnification from the short focal end to the long focal end, and TL denotes a total length of the lens.

If the value is larger than the upper limit of the condition formula [12], the amount of movement of the second lens unit becomes too large, and thus, the thickness of the lens unit or the air gap becomes small, so that it is difficult to correct the aberrations overall. In addition, if the value is smaller than the lower limit of the condition formula [12], the amount of movement of the second lens unit becomes too small, and thus, the focal length of the second lens unit becomes small, so that it is difficult to correct the aberrations in the second lens unit.

In addition, when the light amount arriving on the image surface needs to be reduced, although the aperture stop may be configured to be decreased, it is preferable that the light amount be reduced by inserting an ND filter or the like into the optical axis without greatly changing the diameter of the aperture stop in terms that the deterioration in the resolving power according to the diffraction phenomenon may be prevented.

It is preferable that a laminated-type diffraction optical element be used for the diffraction plane.

If the optical elements having appropriate refractive index difference with respect to each wavelength are laminated, it is possible to increase diffraction efficiency over the wide wavelength range.

In addition, the laminated optical element may be configured to be in close contact with the lens surface. Furthermore, if the cemented surface of the lens is configured as a diffraction structure, it is possible to implement a robust configuration which may withstand an influence (disturbance) of the environment on the diffraction plane.

In one example, the above-described zoom lens may be incorporated in a so-called digital camera as a photographing optical system, or in a so-called movie camera as a moving picture photographing optical system. More specifically, the camera includes the above-described zoom lens as a photographing optical system, so that it is possible to implement a small-sized, high-image-quality camera having a magnification changing range capable of sufficiently covering a typical photographing range.

In another example, the above-described zoom lens may be incorporated in a so-called portable information terminal device having a photographing function unit, as a photographing optical system. With this zoom lens, it is possible to provide a small-sized, high-image-quality portable information terminal device having a magnification changing range capable of sufficiently covering a typical photographing range. Therefore, it is possible for a user to photograph a high-quality image with a portable information terminal device having an excellent portability and to transmit the image to an external portion.

Moreover, if the zoom is applied to a small-sized, high-performance monitoring camera or monitoring video camera, it is possible to achieve great practical effects, as the above-described zoom lens is adapted to an imaging device having a seamless coverage from a visible range to a near IR range.

Further, with the zoom lens having better correction of chromatic aberration and high performance, it is possible to implement a camera capable of obtaining good representation where color blur or the like over the entire screen at the long focal end is further suppressed.

Further, with a zoom lens having a small size and high performance, it is possible to implement a small-sized, high-image-quality camera or a portable information terminal device.

In addition, as described above, since it is possible to provide a zoom lens having better correction of each aberration and high performance, it is possible to implement a camera having a higher resolving power and a high image quality.

As described above, in one example, since it is possible to provide a small-sized, high-performance device using a zoom lens having a magnification changing ratio of about X20, a half angle of view of about 30 degrees at the short focal end, an F number of 2.0 or less at the short focal end, an F number of about 2.5 at the long focal end, the number of lens constituents of about 13, a small size, and a resolving power corresponding to imaging elements of 2 mega to 5 mega pixels as a photographing optical system, it is possible for a user to photograph a high quality image with the device having an excellent portability.

Such device may be a camera, or a portable information terminal device. When the zoom lens is employed for the portable information terminal device, the device is may be provided with a function of transmitting the image to an external apparatus.

Next, specific examples based on the above-described principle embodiment of the present invention will be described in detail. Examples 1 to 4 described hereinafter are examples having specific configurations corresponding to numerical examples (Numerical Examples) of the zoom lenses according to the first to fourth embodiments of the present invention. FIGS. 1 to 4 are diagrams for explaining the zoom lens according to Example 1 of the first embodiment of the present invention. FIGS. 5 to 8 are diagrams for explaining the zoom lens according to Example 2 of the second embodiment of the present invention. FIGS. 9 to 12 are diagrams for explaining the zoom lens according to Example 3 of the third embodiment of the present invention. In addition, FIGS. 13 to 16 are diagrams for explaining the zoom lens according to Example 4 of the fourth embodiment of the present invention.

All the zoom lenses according to Examples 1 to 4 are so-called positive-negative-positive-positive four-lens-unit zoom lenses, where the first lens unit having a positive refractive power, the second lens unit having a negative refractive power, the third lens unit having a positive refractive power, and the fourth lens unit having a positive refractive power are arranged in order from the object side.

In the zoom lens of each example of Examples 1 to 4, an optical element configured with a parallel plate arranged at the image surface side of the fourth lens unit is assumed to be various optical filters such as an optical low pass filter and a UV cutoff filter, a cover glass (seal glass) for an image-receiving/imaging element such as a CMOS (complementary metal oxide semiconductor) image sensor or a CCD (charge coupled device) image sensor, or the like. Herein, the element is collectively referred to as a filter FG as an equivalent transparent parallel plate.

In addition, various filters F such as an ND filter may be inserted at the object side or the image side of the aperture stop AD.

In addition, glass materials used in each example of Examples 1 to 4 are indicated by optical glass type names of products of OHARA CORPORATION and HOYA CORPORATION.

In all the examples, although all the materials of lenses are described to be optical glass, a resin lens may be used.

In the zoom lens of each example of Examples 1 to 4, the aberrations are sufficiently corrected, so that the examples may be adapted to an image receiving element of 2 mega to 5 mega pixels or more. It will be obvious from Examples 1 to 4 that, if the zoom lens is configured according to the first to fourth embodiments of the present invention, it is possible to achieve a sufficiently small size and to secure a very excellent imaging performance.

Meanings of symbols common to Examples 1 to 4 are as follows.
  f: focal length of the entire system of an optical system
  F: F value (F number)
  ω: half angle of view (degrees)
  R: radius of curvature
  D: surface interval
  $n_d$: refractive index
  $v_d$: Abbe number
  C2: coefficient of the second-order term of a phase function
  C4: coefficient of the fourth-order term of the phase function When a reference wavelength (d-line) is denoted by λd, a distance from an optical axis is denoted by h, and a phase is denoted by φ(h), the shape of the diffraction grating is expressed by:

$$\phi(h)=(2\pi/\lambda d)(C2 \cdot h^2 + C4 \cdot h^4).$$

Example 1

FIG. 1 illustrates a lens configuration of an optical system and a zoom locus involved with zooming from a short focal end, that is, a wide-angle end, through a predetermined intermediate focal length to a long focal end, that is, a telephoto end according to the zoom lens of Example 1 of the first embodiment of the present invention. FIG. 1(a) is a cross-sectional diagram illustrating the short focal end, that is, the wide-angle end. FIG. 1(b) is a cross-sectional diagram illustrating the predetermined intermediate focal length, and FIG. 1(c) is a cross-sectional diagram illustrating the long focal end, that is, the telephoto end. In addition, in FIGS. 1(a) to 1(c) illustrating the arrangement of the lens unit of Example 1, the left side of the illustration is the object side (subject side).

The zoom lens illustrated in FIG. 1 is includes, in order from the object side, a first lens unit G1 having a positive refractive power, a second lens unit G2 having a negative refractive power, a third lens unit G3 having a positive refractive power, and a fourth lens unit G4 having a positive refractive power.

Each unit of the first to fourth lens units G1 to G4 is supported by an appropriate common support frame or the like for each unit, and during the zooming or the like, each unit of the second to fourth lens units G2 to G4 is integrally operated. The aperture stop AD is installed so as to be stationary with respect to the image surface. In FIGS. 1(a) to 1(c), each optical surface is indicated by a surface number. In addition, each reference numeral in FIGS. 1(a) to 1(c) is used independently of each example in order to avoid complication of the description due to an increase in digit number of reference numerals. Therefore, a component indicated by the same reference numeral in the figures associated with a different embodiment may not necessarily have the same configuration as that of the different embodiment.

During change of magnification from the short focal end (wide-angle end) to the long focal end (telephoto end), the first lens unit G1 is stationary, the second lens unit G2 is moved to the image side, the third lens unit G3 is moved to the object side, and the fourth lens unit G4 is moved. Therefore, during change of magnification from the short focal end to the long focal end, the movement is performed so that the distance between the first lens unit G1 and the second lens unit G2 is increased, and the distance between the second lens unit G2 and the third lens unit G3 is decreased.

In the first embodiment of the present invention illustrated in FIG. 1, the first lens unit G1 of the zoom lens according to Example (numerical example: hereinafter, the same) 1 includes, in order from the object side, a negative lens L1 which is configured with a negative meniscus lens directing the concave surface toward the image side, a positive lens L2 which is configured with a biconvex lens directing the convex surface having a large curvature from the image side toward the object side, and a positive lens L3 which is configured with a positive meniscus lens directing the convex surface toward the object side.

In addition, the two lenses of the negative lens L1 and the positive lens L2 of the first lens unit G1 are closely adhered to each other to be integrally cemented, so that a two-sheet cemented lens is formed.

The second lens unit G2 is configured to include, in order from the object side, a negative lens L4 which is configured with a negative meniscus lens directing the concave surface toward the image side, a negative lens L5 which is configured with a biconcave lens directing the concave surface having a large curvature from the surface of the object side toward the image side, and a positive lens L6 which is configured with a positive meniscus lens directing the convex surface toward the object side. In addition, the two lenses of the positive lens L5 and the negative lens L6 of the second lens unit G2 are closely adhered to each other to be integrally cemented, so that a two-sheet cemented lens is formed.

The third lens unit G3 is configured to include, in order from the object side, a positive lens L7 which is configured with a biconvex lens directing the convex surface having a large curvature from the image side to the object side, a positive lens L8 which is configured with a biconvex lens directing the convex surface having a large curvature from the surface of the image side toward the object side, a negative lens L9 which is configured with a biconcave lens directing the concave surface having a large curvature from the surface of the object side to the image side, and a positive lens L10 which is configured with a biconvex lens directing the convex surface having a large curvature from the surface of the image side toward the object side.

A laminated-type diffraction optical element is configured to be in close contact with the lens surface of the third lens unit G3, in the case of this example, the cemented surface of the positive lens L8 and the negative lens L9.

In addition, the two lenses of the positive lens L8 and the negative lens L9 of the third lens unit G3 are closely adhered to each other to be integrally cemented, so that a two-sheet cemented lens is formed.

The aperture stop AD is retained between the second lens unit G2 and the third lens unit G3 so as to be stationary with respect to the image side. In addition, various filters (not illustrated) such as an ND filter which is configured with a parallel plate may be installed to be adjacent to the aperture stop AD.

The fourth lens unit G4 is configured to include, in order from the object side, a positive lens L11 which is configured with a positive meniscus lens directing the convex surface toward the object side, a negative lens L12 which is configured with a negative meniscus lens directing the concave surface toward the image surface side, and a positive lens L13 which is configured with a positive meniscus lens directing the convex surface toward the object side.

A filter or the like FG represented as a transparent parallel plate by considering various optical filters such as an optical low pass filter or an IR cutoff filter or a cover glass (seal glass) for an image-receiving/imaging element such as a CMOS image sensor or a CCD image sensor is arranged at the image surface side of the fourth lens unit G4.

In this case, as illustrated in FIG. 1, during change of magnification from the short focal end to the long focal end, the first lens unit G1 is stationary, the second lens unit G2 is moved to the image side, the third lens unit G3 is moved to the object side, and the fourth lens unit G4 is moved. As a result, the distance between the first lens unit G1 and the second lens unit G2 becomes large, and the distance between the second lens unit G2 and the third lens unit G3 becomes small.

It is preferable that focusing be performed by using the fourth lens unit G4.

This is because, in the case where focusing is performed by using the fourth lens unit, it is possible to perform focusing by using a relatively small lens unit, so that small size and energy saving may be achieved. In addition, advantageously, the amount of focusing movement may also become small, and thus, the focusing operation may be speedily performed.

In Example 1, the focal length f of the entire optical system, the F number F, and the half angle of view ω are changed by the zooming from the short focal end to the long focal end in the respective ranges of f=5.15~22.35~96.98, F=1.85~2.14~2.40, and ω=31.79~7.81~1.81. Optical characteristics of each optical element are listed in the following Table 1.

TABLE 1

| | R | D | n | ν | Glass |
|---|---|---|---|---|---|
| 1 | 109.410 | 1.20 | 1.88300 | 40.76 | S-LAH58(OHARA) |
| 2 | 40.732 | 8.60 | 1.49700 | 81.54 | S-FPL51(OHARA) |
| 3 | −535.009 | 0.50 | | | |
| 4 | 42.427 | 6.97 | 1.59282 | 68.62 | FCD505(HOYA) |
| 5 | 781.235 | DA | | | |
| 6 | 119.919 | 1.20 | 1.91082 | 35.25 | TAFD35(HOYA) |
| 7 | 12.639 | 5.81 | | | |
| 8 | −27.304 | 1.20 | 1.49700 | 81.54 | S-FPL51(OHARA) |
| 9 | 17.258 | 3.21 | 1.92286 | 20.88 | EFDS1(HOYA) |
| 10 | 60.063 | DB | | | |
| 11 | Aperture stop | DC | | | |
| 12 | 26.823 | 3.34 | 1.61800 | 63.33 | S-PHM52(OHARA) |
| 13 | −259.317 | 0.50 | | | |
| 14 | 18.541 | 4.10 | 1.49700 | 81.54 | S-FPL51(OHARA) |
| 15* | −57.729 | 4.10 | 1.91082 | 35.25 | TAFD35(HOYA) |
| 16 | 17.774 | 2.31 | | | |
| 17 | 57.676 | 4.00 | 1.92286 | 20.88 | EFDS1(HOYA) |
| 18 | −169.208 | DD | | | |
| 19 | 11.829 | 4.00 | 1.67790 | 55.34 | S-LAL12(OHARA) |
| 20 | 28.345 | 1.51 | | | |
| 21 | 11.390 | 1.79 | 1.92286 | 18.90 | S-NPH2(OHARA) |
| 22 | 6.845 | 5.70 | | | |
| 23 | 9.461 | 4.00 | 1.49700 | 81.54 | S-FPL51(OHARA) |
| 24 | 52.336 | DE | | | |
| 25 | 0.000 | 1.60 | 1.51633 | 64.10 | Filter or the like |
| 26 | 0.000 | | | | |

In Example 1, variable amounts such as the focal length f of the entire optical system the F value (F number), the half angle of view ω, the variable distance DA between the first lens unit G1 and the second lens unit G2, the variable distance DB between the second lens unit G2 and the aperture stop AD, the variable distance DC between the aperture stop AD and the third lens unit G3, the variable distance DD between the third lens unit G3 and the fourth lens unit G4, and the variable distance DE between the fourth lens unit G4 and the filter or the like FG are changed according to zooming as listed in the following Table 2.

TABLE 2

| | Short Focal End | Intermediate Focal Length | Long Focal End |
|---|---|---|---|
| f | 5.15 | 22.35 | 96.98 |
| F Number | 1.85 | 2.14 | 2.40 |
| ω | 31.79 | 7.81 | 1.81 |
| DA | 1.0000 | 34.0947 | 52.5516 |
| DB | 54.1574 | 21.0315 | 2.5200 |
| DC | 15.3209 | 6.4692 | 1.0000 |
| DD | 3.0000 | 5.8170 | 10.1595 |
| DE | 5.4395 | 11.4731 | 12.5996 |

When the coefficients of the second-order and fourth-order terms of the phase function are denoted by C2 and C4, respectively, the focal length f3DOE of the diffraction plane is expressed by:

$$f3DOE = -1(2 \times C2).$$

In Example 1, the coefficient C2 of the second-order term of the phase function of the diffraction plane formed on the 15th surface, that is, the cemented surface between the positive lens L8 and the negative lens L9 is listed in the following Table 3. In addition, the coefficient C4 of the fourth-order term of the phase function is also listed.

TABLE 3

| | Coefficient of Phase Function | | |
|---|---|---|---|
| | λ | C2 | C4 |
| 15 | 587.6 | −2.01181E−04 | 1.15003E−06 |

In addition, as described above, when a reference wavelength (d-line) is denoted by d, a distance from an optical axis is denoted by h, and a phase is denoted by φ(h), the shape of the diffraction grating is expressed by:

$$\phi(h) = 2\pi/\lambda d (C2 \cdot h^2 + C4 \cdot h^4).$$

In the case of Example 1, the values corresponding to the aforementioned condition formulas [1] to [12] are listed in the following Table 4 and satisfy the respective condition formulas [1] to [12].

TABLE 4

| | Condition Formula | | |
|---|---|---|---|
| L2 | $n_d$ | (1) | 1.49700 |
| | $\nu_d$ | (2) | 81.54 |
| | $P_{gF} - (-0.001802 \times \nu_d + 0.6483)$ | (3) | 0.036 |
| L3 | $n_d$ | (1) | 1.59282 |
| | $\nu_d$ | (2) | 68.62 |
| | $P_{gF} - (-0.001802 \times \nu_d + 0.6483)$ | (3) | 0.019 |
| | f3DOE/ft | (4) | 25.63 |
| | f3DOE/fw | (4') | 482.67 |
| | f3DOE/fw | (4") | 58.19 |
| | f1/ft | (5) | 0.80 |
| | f2/ft | (6) | −0.13 |
| | f3/ft | (7) | 0.44 |
| | f4/ft | (8) | 0.28 |
| | D3_4w/fw | (9) | 0.58 |
| | D3_4t/ft | (10) | 0.10 |
| | (b2t/b2w)/(ft/fw) | (11) | 0.50 |
| | m2/TL | (12) | 0.36 |

Figure 2:
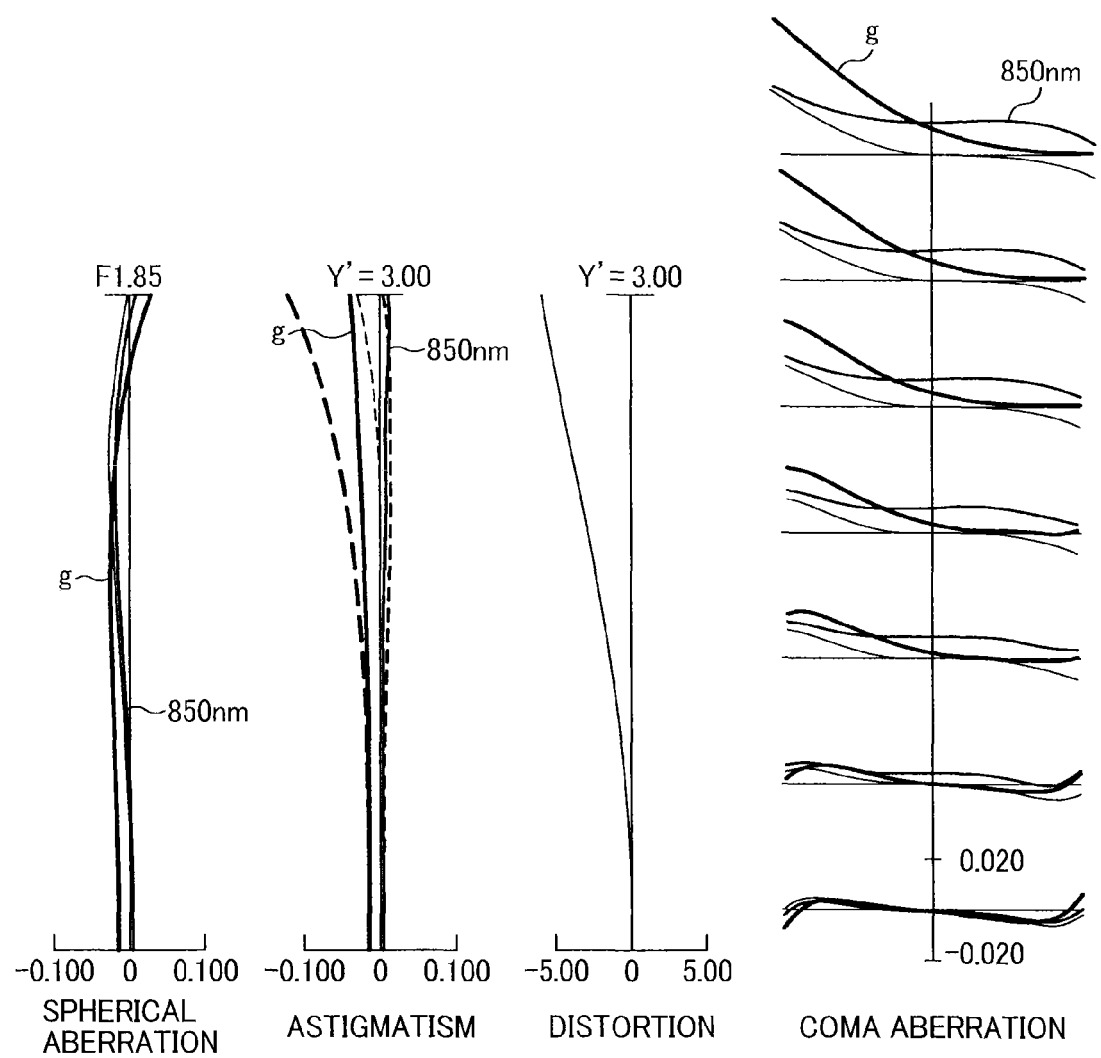
FIG. 2 is an aberration graph illustrating spherical aberration, astigmatism, distortion, and coma aberration at the short focal end (wide-angle end) of the zoom lens according to Example 1 of the present invention illustrated in FIG. 1.
Figure 3:
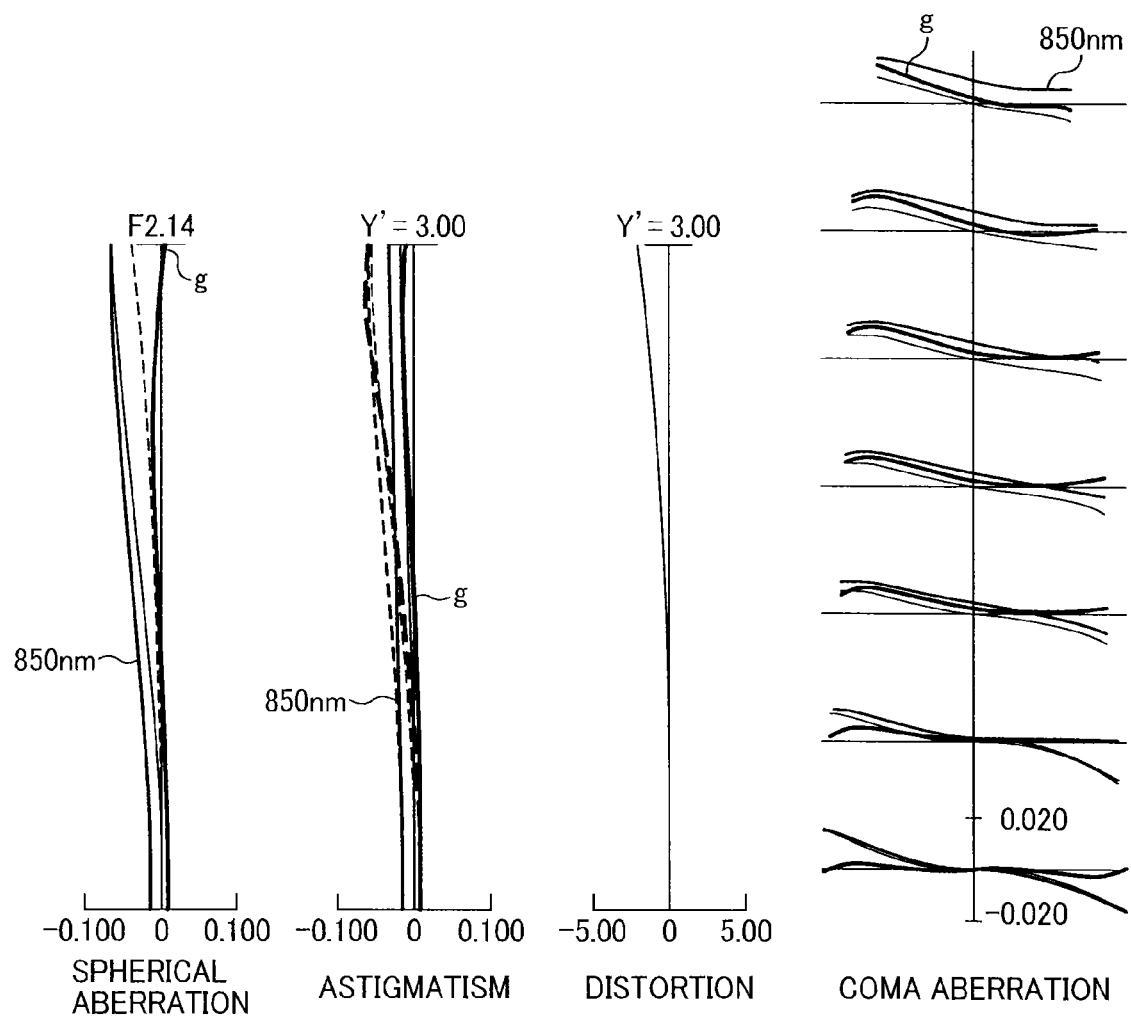
FIG. 3 is an aberration graph illustrating spherical aberration, astigmatism, distortion, and coma aberration at the intermediate focal length of the zoom lens according to Example 1 of the present invention illustrated in FIG. 1.
Figure 4:
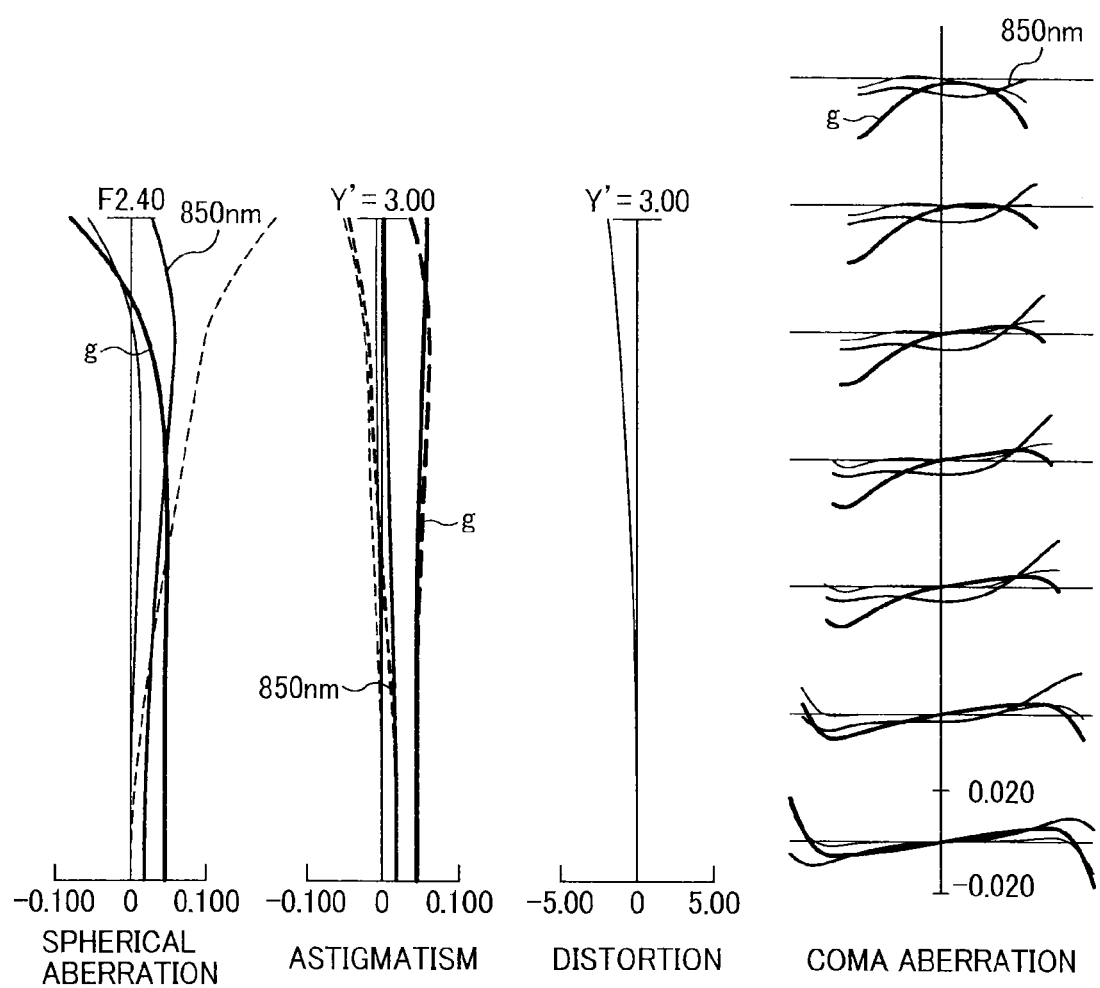
FIG. 4 is an aberration graph illustrating spherical aberration, astigmatism, distortion, and coma aberration at the long focal end (telephoto end) of the zoom lens according to Example 1 of the present invention illustrated in FIG. 1.

In addition, FIG. 2, FIG. 3, and FIG. 4 illustrate aberration graphs of spherical aberration, astigmatism, distortion, and coma aberration at the short focal end (wide-angle end), the intermediate focal length, and the long focal end (telephoto end) of Example 1, respectively. In addition, in the aberration graphs, a broken line of the spherical aberration graph indicates a sinusoidal condition; and a solid line and a broken line of the astigmatism graph indicate sagittal and meridional, respectively. These are the same in aberration graphs of other examples.

As obvious from FIGS. 2 to 4, in the zoom lens according to Example 1, the aberrations are sufficiently corrected. Since the example may be adapted to an image receiving element of 2 mega to 5 mega pixels, it is obvious that, if the zoom lens is configured according to Example 1, it is possible to achieve a sufficiently small size and to secure a very excellent imaging performance.

Example 2

Figure 5:
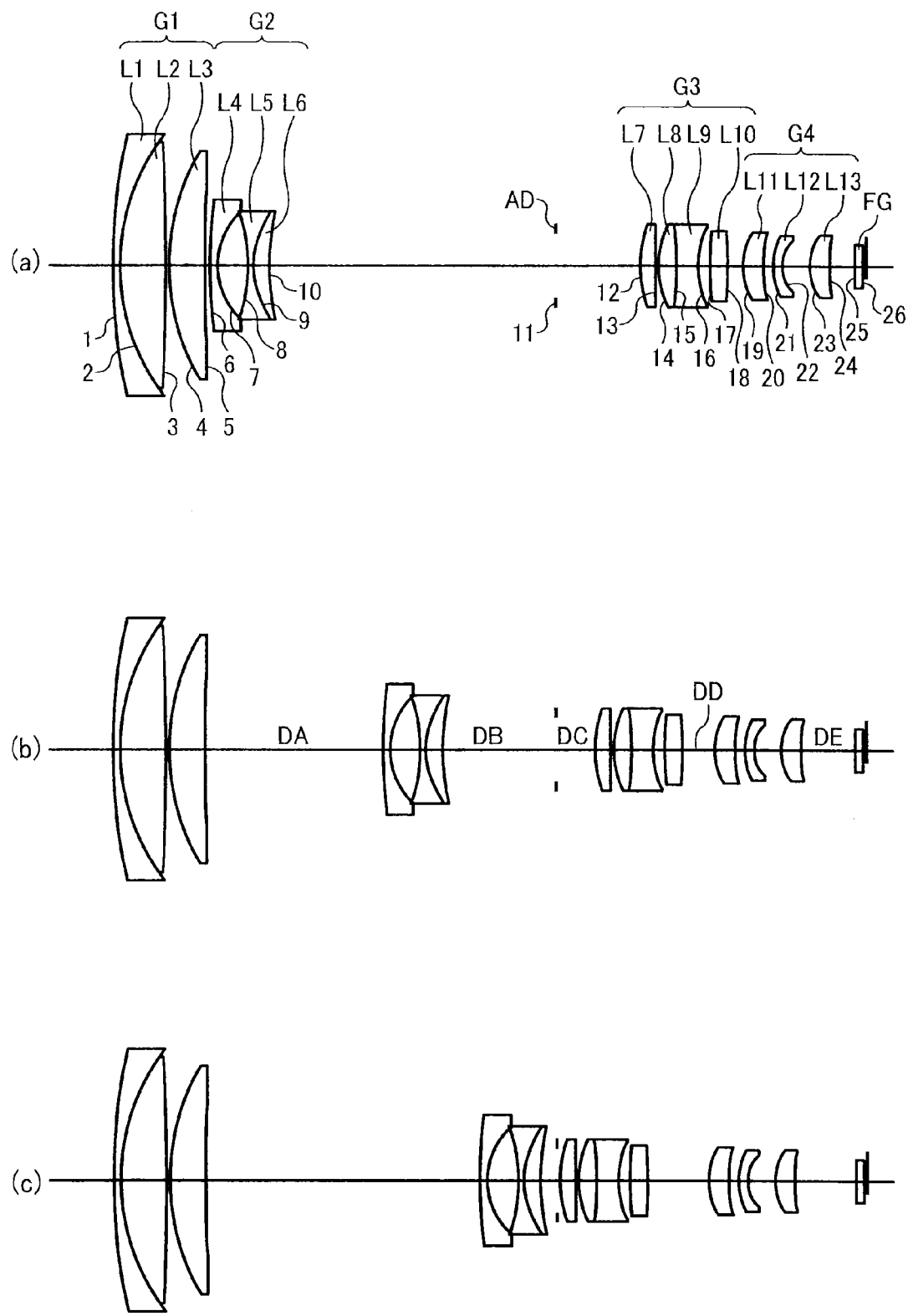
FIG. 5 is a schematic diagram illustrating a configuration of an optical system and a zoom locus involved with zooming of a zoom lens according to Example 2 of a second embodiment of the present invention.

FIG. 5 illustrates a lens configuration of an optical system and a zoom locus involved with zooming from a short focal end, that is, a wide-angle end, through a predetermined intermediate focal length to a long focal end, that is, a telephoto end according to the zoom lens according to Example 2 of the second embodiment of the present invention, FIG. 5(a) is a cross-sectional diagram illustrating the short focal end, that is, the wide-angle end, FIG. 5(b) is a cross-sectional diagram illustrating the predetermined intermediate focal length, and FIG. 5(c) is a cross-sectional diagram illustrating the long focal end, that is, the telephoto end. In addition, in FIGS. 5(a) to 5(c) illustrating the arrangement of the lens unit of Example 2, the left side of the illustration is the object side (subject side).

The zoom lens illustrated in FIGS. 5(a) to 5(c) is configured to include, in order from the object side, a first lens unit G1 having a positive refractive power, a second lens unit G2 having a negative refractive power, a third lens unit G3 having a positive refractive power, and a fourth lens unit G4 having a positive refractive power.

Each unit of the first to fourth lens units G1 to G4 is supported by an appropriate common support frame or the like for each unit, and during the zooming or the like, each unit of the second to fourth lens units G2 to G4 is integrally operated. The aperture stop AD is installed so as to be stationary with respect to the image surface. In FIGS. 5(a) to 5(c), each optical surface is indicated by a surface number. In addition, each reference numeral in FIGS. 5(a) to 5(c) is used independently of each example in order to avoid complication of the description due to an increase in digit number of reference numerals. Therefore, a component indicated by the same reference numeral in the figures associated with a different embodiment may not necessarily have the same configuration as that of the different embodiment.

During change of magnification from the short focal end (wide-angle end) to the long focal end (telephoto end), the first lens unit G1 is stationary, the second lens unit G2 is moved to the image side, the third lens unit G3 is moved to the object side, and the fourth lens unit G4 is moved. Therefore, during change of magnification from the short focal end to the long focal end, the movement is performed so that the distance between the first lens unit G1 and the second lens unit G2 is increased, and the distance between the second lens unit G2 and the third lens unit G3 is decreased.

In the second embodiment of the present invention illustrated in FIGS. 5(a) to 5(c), the first lens unit G1 of the zoom lens according to Example (numerical example: hereinafter, the same) 2 is configured to include, in order from the object side, a negative lens L1 which is configured with a negative meniscus lens directing the concave surface toward the image side, a positive lens L2 which is configured with a biconvex lens directing the convex surface having a large curvature from the image side toward the object side, and a positive lens L3 which is configured with a positive meniscus lens directing the convex surface toward the object side.

In addition, the two lenses of the negative lens L1 and the positive lens L2 of the first lens unit G1 are closely adhered to each other to be integrally cemented, so that a two-sheet cemented lens is formed.

The second lens unit G2 is configured to include, in order from the object side, a negative lens L4 which is configured with a negative meniscus lens directing the concave surface toward the image side, a negative lens L5 which is configured with a biconcave lens directing the concave surface having a large curvature from the surface of the object side toward the image side, and a positive lens L6 which is configured with a positive meniscus lens directing the convex surface toward the object side. In addition, the two lenses of the positive lens L5 and the negative lens L6 of the second lens unit G2 are closely adhered to each other to be integrally cemented, so that a two-sheet cemented lens is formed.

The third lens unit G3 is configured to include, in order from the object side, a positive lens L7 which is configured with a biconvex lens directing the convex surface having a large curvature from the image side to the object side, a positive lens L8 which is configured with a biconvex lens directing the convex surface having a large curvature from the surface of the image side toward the object side, a negative lens L9 which is configured with a biconcave lens directing the concave surface having a large curvature from the surface of the object side to the image side, and a positive lens L10 which is configured with a biconvex lens directing the convex surface having a large curvature from the surface of the image side toward the object side.

A laminated-type diffraction optical element is configured to be in close contact with the lens surface of the third lens unit G3, in the case of this example, the cemented surface of the positive lens L8 and the negative lens L9.

In addition, the two lenses of the positive lens L8 and the negative lens L9 of the third lens unit G3 are closely adhered to each other to be integrally cemented, so that a two-sheet cemented lens is formed.

The aperture stop AD is retained between the second lens unit G2 and the third lens unit G3 so as to be stationary with respect to the image side. In addition, various filters (not illustrated) such as an ND filter which is configured with a parallel plate may be installed to be adjacent to the aperture stop AD.

The fourth lens unit G4 is configured to include, in order from the object side, a positive lens L11 which is configured with a positive meniscus lens directing the convex surface toward the object side, a negative lens L12 which is configured with a negative meniscus lens directing the concave surface toward the image surface side, and a positive lens L13 which is configured with a positive meniscus lens directing the convex surface toward the object side.

A filter or the like FG represented as a transparent parallel plate by considering various optical filters such as an optical low pass filter or an IR cutoff filter or a cover glass for an image-receiving/imaging element such as a CMOS image sensor or a CCD image sensor is arranged at the image surface side of the fourth lens unit G4.

In this case, as illustrated in FIGS. 5(a) to 5(c), during change of magnification from the short focal end to the long focal end, the first lens unit G1 is stationary, the second lens unit G2 is moved to the image side, the third lens unit G3 is moved to the object side, and the fourth lens unit G4 is moved. As a result, the distance between the first lens unit G1 and the second lens unit G2 becomes large, and the distance between the second lens unit G2 and the third lens unit G3 becomes small.

It is preferable that focusing be performed by using the fourth lens unit G4.

This is because, in the case where focusing is performed by using the fourth lens unit, it is possible to perform focusing by using a relatively small lens unit, so that small size and energy saving may be achieved. In addition, advantageously, the amount of focusing movement may also become small, and thus, the focusing operation may be speedily performed.

In Example 2, the focal length f of the entire optical system, the F number F, and the half angle of view ω are changed by the zooming from the short focal end to the long focal end in the respective ranges of f=5.15~22.36~97.02, F=1.83~2.15~2.48, and ω=31.80~7.79~1.80. Optical characteristics of each optical element are listed in the following Table 5.

TABLE 5

|   | R | D | n | ν | Class |
|---|---|---|---|---|---|
| 1 | 119.272 | 1.20 | 1.88300 | 40.76 | S-LAH58(OHARA) |
| 2 | 41.074 | 8.84 | 1.49700 | 81.54 | S-FPL51(OHARA) |
| 3 | −433.949 | 0.50 | | | |
| 4 | 43.033 | 7.00 | 1.59349 | 67.00 | PCD51(HOYA) |
| 5 | 1321.053 | DA | | | |
| 6 | 135.619 | 1.20 | 1.91082 | 35.25 | TAFD35(HOYA) |
| 7 | 13.238 | 6.17 | | | |
| 8 | −31.367 | 1.20 | 1.49700 | 81.54 | S-FPL51(OHARA) |
| 9 | 17.450 | 3.22 | 1.92286 | 20.88 | EFDS1(HOYA) |
| 10 | 55.945 | DB | | | |
| 11 | Aperture stop | DC | | | |
| 12 | 23.713 | 3.04 | 1.61800 | 63.33 | S-PHM52(OHARA) |
| 13 | −424.604 | 0.50 | | | |
| 14 | 19.413 | 3.49 | 1.49700 | 81.54 | S-FPL51(OHARA) |
| 15* | −52.000 | 4.10 | 1.91082 | 35.25 | TAFD35(HOYA) |
| 16 | 17.565 | 2.07 | | | |
| 17 | 49.780 | 3.53 | 1.92286 | 20.88 | EFDS1(HOYA) |
| 18 | −230.036 | DD | | | |
| 19 | 11.784 | 4.00 | 1.67790 | 55.34 | S-LAL12(OHARA) |
| 20 | 29.776 | 1.79 | | | |
| 21 | 11.276 | 1.91 | 1.92286 | 18.90 | S-NPH2(OHARA) |
| 22 | 6.517 | 5.12 | | | |
| 23 | 8.742 | 4.00 | 1.49700 | 81.54 | S-FPL51(OHARA) |
| 24 | 35.536 | DE | | | |
| 25 | 0.000 | 1.60 | 1.51633 | 64.10 | Filter or the like |
| 26 | 0.000 | | | | |

In Example 2, variable amounts such as the focal length f of the entire optical system, the F value (F number), the half angle of view ω, the variable distance DA between the first lens unit G1 and the second lens unit G2, the variable distance DB between the second lens unit G2 and the aperture stop AD, the variable distance DC between the aperture stop AD and the third lens unit G3, the variable distance DD between the third lens unit G3 and the fourth lens unit G4, and the variable distance DE between the fourth lens unit G4 and the filter or the like FG are changed according to zooming as listed in the following Table 6.

TABLE 6

|   | Short Focal End | Intermediate Focal Length | Long Focal End |
|---|---|---|---|
| f | 5.15 | 22.36 | 97.02 |
| F Number | 1.83 | 2.15 | 2.48 |
| ω | 31.80 | 7.79 | 1.80 |
| DA | 1.0000 | 34.5016 | 53.3300 |
| DB | 54.9485 | 21.4883 | 2.5447 |
| DC | 16.1219 | 7.3145 | 1.0000 |

TABLE 6-continued

|   | Short Focal End | Intermediate Focal Length | Long Focal End |
|---|---|---|---|
| DD | 3.0000 | 6.3025 | 11.5117 |
| DE | 4.9947 | 10.5056 | 11.6109 |

When the coefficients of the second-order and fourth-order terms of the phase function are denoted by C2 and C4, respectively, the focal length f3DOE of the diffraction plane is expressed by:

$$f3DOE = -1(2 \times C2).$$

In Example 2, the coefficient C2 of the second-order term of the phase function of the diffraction plane formed on the 15th surface, that is, the cemented surface between the positive lens L8 and the negative lens L9 is listed in the following Table 7. In addition, the coefficient C4 of the fourth-order term of the phase function is also listed.

TABLE 7

| | Coefficient of Phase Function | | |
|---|---|---|---|
| | λ | C2 | C4 |
| 15 | 587.6 | −1.97602E−04 | 1.13716E−06 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d (C2 \cdot h^2 + C4 \cdot h^4).$$

In the case of Example 2, the values corresponding to the aforementioned condition formulas [1] to [12] are listed in the following Table 8 and satisfy the respective condition formulas [1] to [12].

TABLE 8

| | Condition Formula | | |
|---|---|---|---|
| L2 | $n_d$ | (1) | 1.49700 |
| | $\nu_d$ | (2) | 81.54 |
| | $P_{gF} - (-0.001802 \times \nu_d + 0.6483)$ | (3) | 0.036 |
| L3 | $n_d$ | (1) | 1.59349 |
| | $\nu_d$ | (2) | 67.00 |
| | $P_{gF} - (-0.001802 \times \nu_d + 0.6483)$ | (3) | 0.009 |
| | f3DOE/ft | (4) | 26.08 |
| | f3DOE/fw | (4') | 491.18 |
| | f3DOE/fw | (4") | 59.79 |
| | f1/ft | (5) | 0.81 |
| | f2/ft | (6) | −0.14 |
| | f3/ft | (7) | 0.44 |
| | f4/ft | (8) | 0.28 |
| | D3_4w/fw | (9) | 0.58 |
| | D3_4t/ft | (10) | 0.12 |
| | (b2t/b2w)/(ft/fw) | (11) | 0.49 |
| | m2/TL | (12) | 0.36 |

Figure 6:
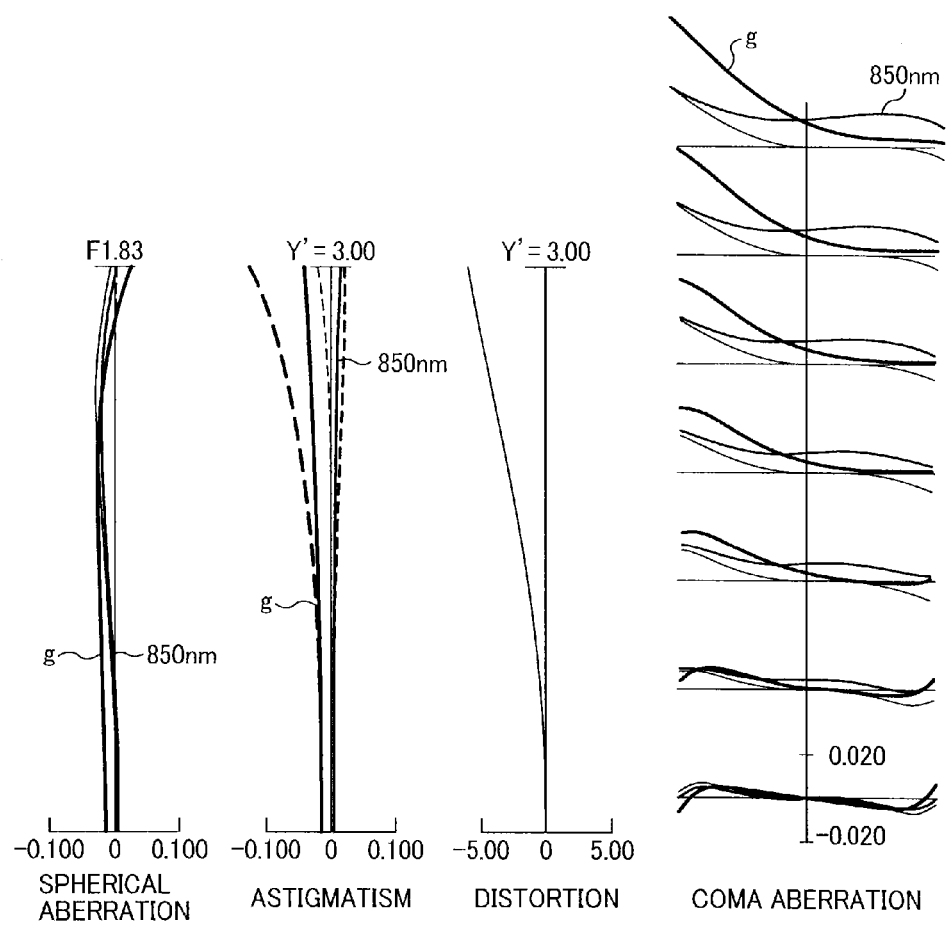
FIG. 6 is an aberration graph illustrating spherical aberration, astigmatism, distortion, and coma aberration at the short focal end of the zoom lens according to Example 2 of the present invention illustrated in FIG. 5.
Figure 7:
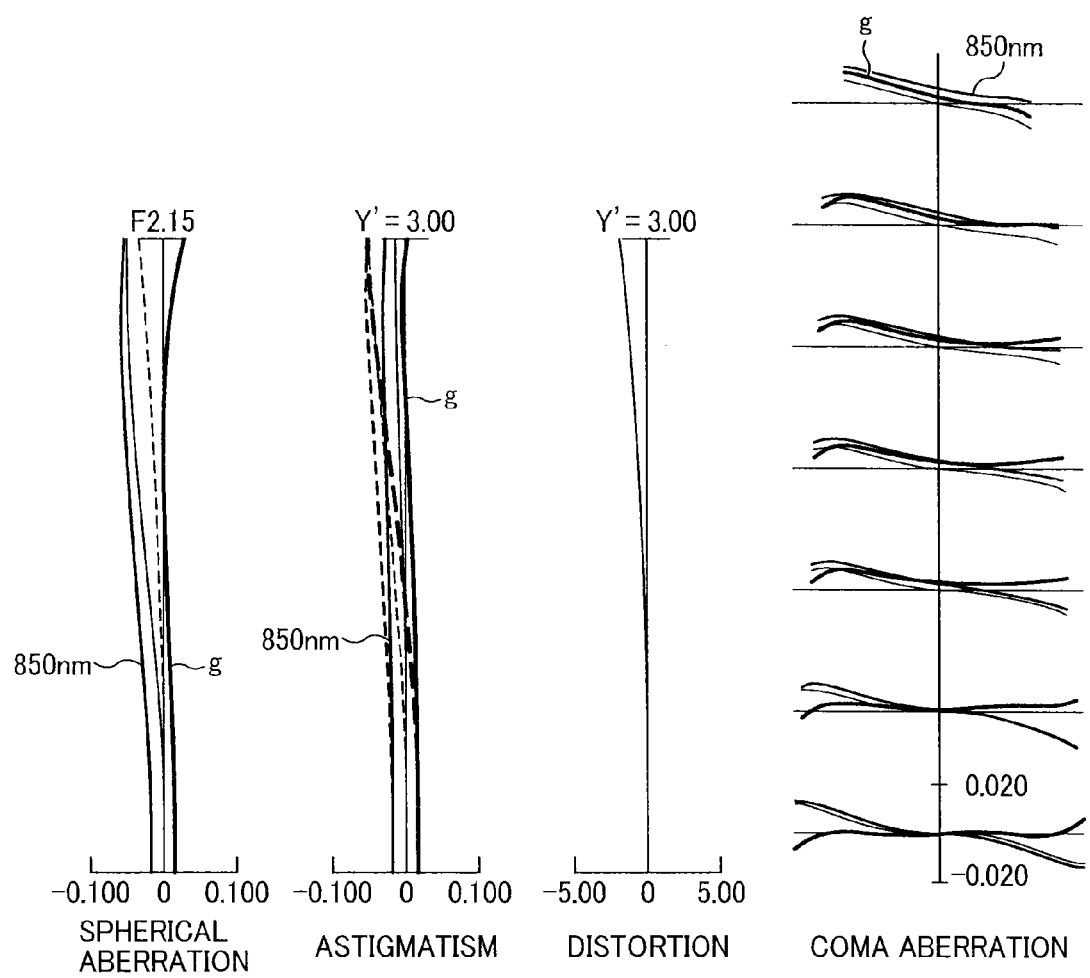
FIG. 7 is an aberration graph illustrating spherical aberration, astigmatism, distortion, and coma aberration at the intermediate focal length of the zoom lens according to Example 2 of the present invention illustrated in FIG. 5.
Figure 8:
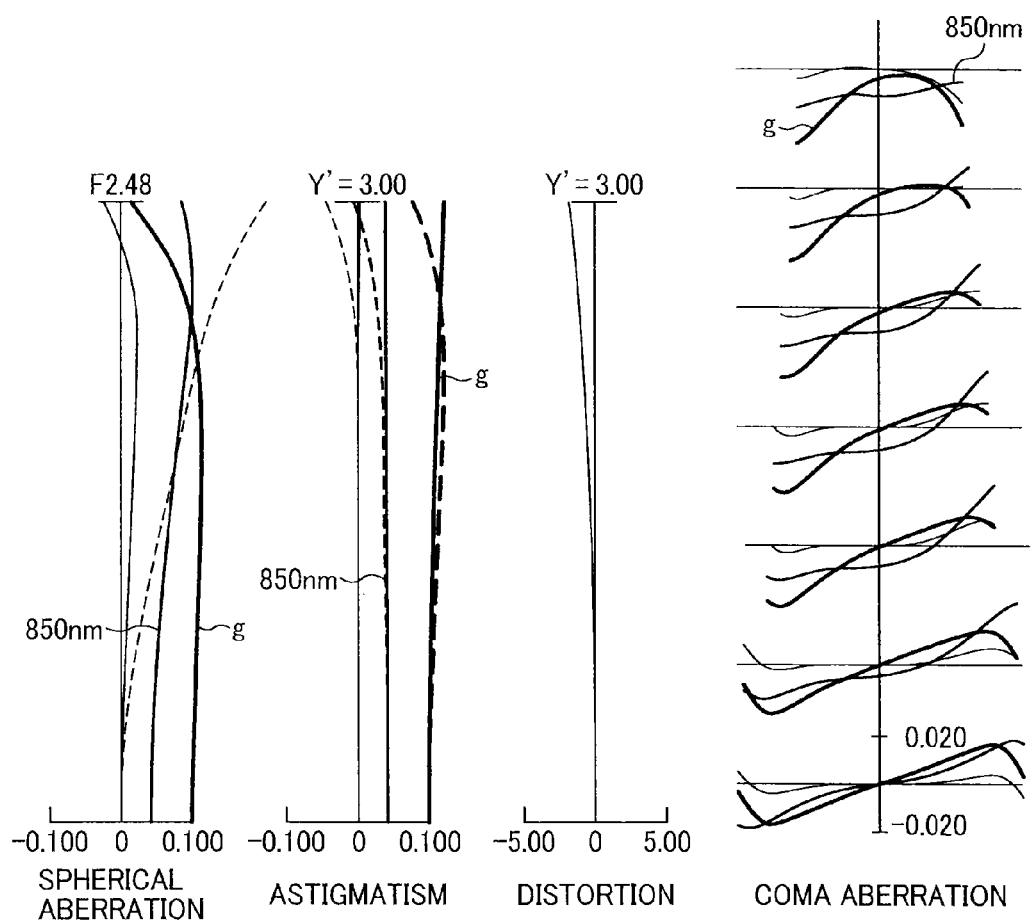
FIG. 8 is an aberration graph illustrating spherical aberration, astigmatism, distortion, and coma aberration at the long focal end of the zoom lens according to Example 2 of the present invention illustrated in FIG. 5.

In addition, FIG. 6, FIG. 7, and FIG. 8 illustrate aberration graphs of spherical aberration, astigmatism, distortion, and coma aberration at the short focal end (wide-angle end), the intermediate focal length, and the long focal end (telephoto end) of Example 2, respectively. In addition, in the aberration graphs, a broken line of the spherical aberration graph indicates a sinusoidal condition; and a solid line and a broken line of the astigmatism graph indicate sagittal and meridional, respectively. These are the same in aberration graphs of other examples.

As obvious from FIGS. 6 to 8, in the zoom lens according to Example 2, the aberrations are sufficiently corrected. Since the example may be adapted to an image receiving element of 2 mega to 5 mega pixels, it is obvious that, if the zoom lens is configured according to Example 2, it is possible to achieve a sufficiently small size and to secure a very excellent imaging performance.

Example 3

Figure 9:
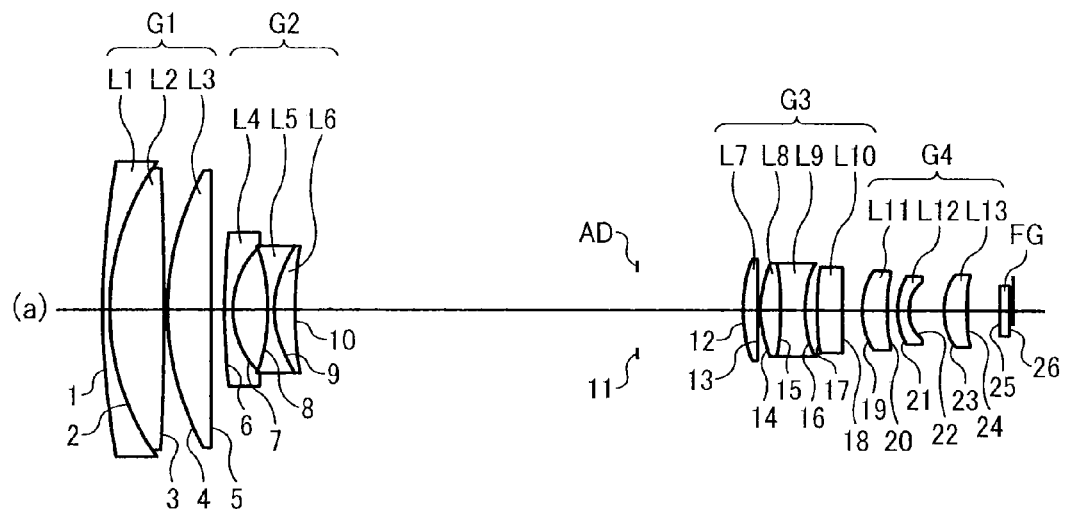
FIG. 9 is a schematic diagram illustrating a configuration of an optical system and a zoom locus involved with zooming of a zoom lens according to Example 3 of a third embodiment of the present invention.
Figure 9:
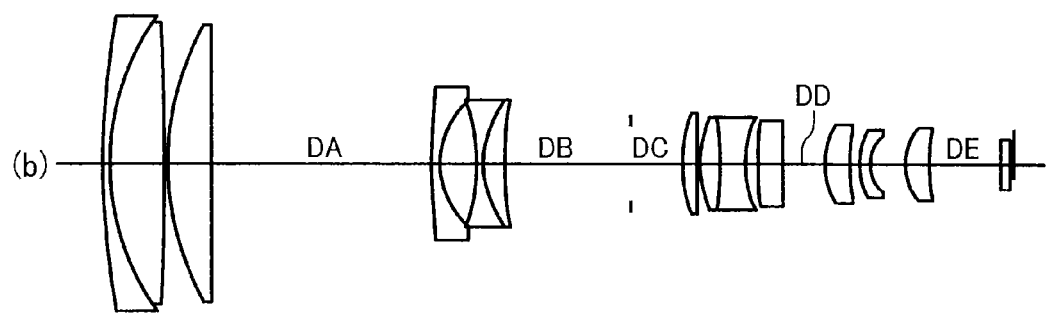
Figure 9:
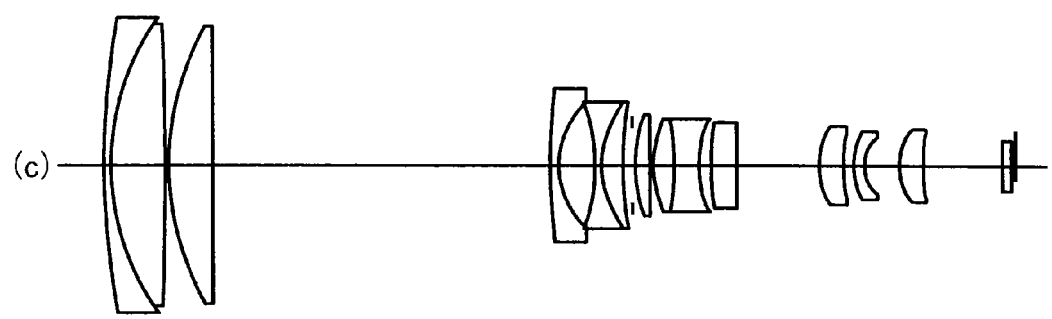

FIG. 9 illustrate a lens configuration of an optical system and a zoom locus involved with zooming from a short focal end through a predetermined intermediate focal length to a long focal end according to the zoom lens according to Example 3 of the third embodiment of the present invention, FIG. 9(a) is a cross-sectional diagram illustrating the short focal end, FIG. 9(b) is a cross-sectional diagram illustrating the predetermined intermediate focal length, and FIG. 9(c) is a cross-sectional diagram illustrating the long focal end. In addition, in FIGS. 9(a) to 9(c) illustrating the arrangement of the lens unit of Example 3, the left side of the illustration is the object side (subject side).

The zoom lens illustrated in FIGS. 9(a) to 9(c) is configured to include, in order from the object side, a first lens unit G1 having a positive refractive power, a second lens unit G2 having a negative refractive power, a third lens unit G3 having a positive refractive power, and a fourth lens unit G4 having a positive refractive power.

Each unit of the first to fourth lens units G1 to G4 is supported by an appropriate common support frame or the like for each unit, and during the zooming or the like, each unit of the second to fourth lens units G2 to G4 is integrally operated.

During change of magnification from the short focal end (wide-angle end) to the long focal end (telephoto end), the first lens unit G1 is stationary, the second lens unit G2 is moved to the image side, the third lens unit G3 is moved to the object side, and the fourth lens unit G4 is moved. Therefore, during change of magnification from the short focal end to the long focal end, the movement is performed so that the distance between the first lens unit G1 and the second lens unit G2 is increased, and the distance between the second lens unit G2 and the third lens unit G3 is decreased.

In the third embodiment of the present invention illustrated in FIGS. 9(a) to 9(c), the first lens unit G1 of the zoom lens according to Example (numerical example: hereinafter, the same) 3 is configured to include, in order from the object side, a negative lens L1 which is configured with a negative meniscus lens directing the concave surface toward the image side, a positive lens L2 which is configured with a biconvex lens directing the convex surface having a large curvature from the image side toward the object side, and a positive lens L3 which is configured with a positive meniscus lens directing the convex surface toward the object side.

In addition, the two lenses of the negative lens L1 and the positive lens L2 of the first lens unit G1 are closely adhered to each other to be integrally cemented, so that a two-sheet cemented lens is formed.

The second lens unit G2 is configured to include, in order from the object side, a negative lens L4 which is configured with a negative meniscus lens directing the concave surface toward the image side, a negative lens L5 which is configured with a biconcave lens directing the concave surface having a large curvature from the surface of the object side toward the image side, and a positive lens L6 which is configured with a positive meniscus lens directing the convex surface toward the object side. In addition, the two lenses of the positive lens L5 and the negative lens L6 of the second lens unit G2 are closely adhered to each other to be integrally cemented, so that a two-sheet cemented lens is formed.

The third lens unit G3 is configured to include, in order from the object side, a positive lens L7 which is configured with a biconvex lens directing the convex surface having a large curvature from the image side to the object side, a positive lens L8 which is configured with a biconvex lens directing the convex surface having a large curvature from the surface of the image side toward the object side, a negative lens L9 which is configured with a biconcave lens directing the concave surface having a large curvature from the surface of the object side to the image side, and a positive lens L10 which is configured with a biconvex lens directing the convex surface having a large curvature from the surface of the image side toward the object side.

A laminated-type diffraction optical element is configured to be in close contact with the lens surface of the third lens unit G3, in the case of this example, the cemented surface of the positive lens L8 and the negative lens L9.

In addition, the two lenses of the positive lens L8 and the negative lens L9 of the third lens unit G3 are closely adhered to each other to be integrally cemented, so that a two-sheet cemented lens is formed.

The aperture stop AD is retained between the second lens unit G2 and the third lens unit G3 so as to be stationary with respect to the image side. In addition, various filters (not illustrated) such as an ND filter which is configured with a parallel plate may be installed to be adjacent to the aperture stop AD.

The fourth lens unit G4 is configured to include, in order from the object side, a positive lens L11 which is configured with a positive meniscus lens directing the convex surface toward the object side, a negative lens L12 which is configured with a negative meniscus lens directing the concave surface toward the image side, and a positive lens L13 which is configured with a positive meniscus lens directing the convex surface toward the object side.

In addition, a filter or the like FG represented as a transparent parallel plate by considering various optical filters such as an optical low pass filter or an IR cutoff filter or a cover glass (seal glass) for an image-receiving/imaging element such as a CMOS image sensor or a CCD image sensor is arranged at the image surface side of the fourth lens unit G4.

In this case, as illustrated in FIGS. 9(a) to 9(c), during change of magnification from the short focal end to the long focal end, the first lens unit G1 is stationary, the second lens unit G2 is moved to the image side, the third lens unit G3 is moved to the object side, and the fourth lens unit G4 is moved. As a result, the distance between the first lens unit G1 and the second lens unit G2 becomes large, and the distance between the second lens unit G2 and the third lens unit G3 becomes small.

It is preferable that focusing be performed by using the fourth lens unit G4.

This is because, in the case where focusing is performed by using the fourth lens unit, it is possible to perform focusing by using a relatively small lens unit, so that small size and energy saving may be achieved. In addition, advantageously, the amount of focusing movement may also become small, and thus, the focusing operation may be speedily performed.

In Example 3, the focal length f of the entire optical system, the F number F, and the half angle of view ω are changed by the zooming from the short focal end to the long focal end in the respective ranges of f=5.30~23.11~99.40, F=1.83~2.14~2.52, and ω=30.59~7.54~1.77. Optical characteristics of each optical element are listed in the following Table 9.

TABLE 9

| | R | D | n | ν | Glass |
|---|---|---|---|---|---|
| 1 | 119.159 | 1.19 | 1.88300 | 40.76 | S-LAH58(OHARA) |
| 2 | 40.807 | 8.75 | 1.49700 | 81.54 | S-FPL51(OHARA) |
| 3 | −436.335 | 0.45 | | | |
| 4 | 42.884 | 7.08 | 1.59349 | 67.00 | PCD51(HOYA) |
| 5 | 1507.886 | DA | | | |
| 6 | 111.035 | 1.20 | 1.91082 | 35.25 | TAFD35(HOYA) |
| 7 | 13.254 | 5.99 | | | |
| 8 | −28.424 | 1.19 | 1.49700 | 81.54 | S-FPL51(OHARA) |
| 9 | 18.091 | 3.34 | 1.92286 | 20.88 | EFDS1(HOYA) |
| 10 | 62.720 | DB | | | |
| 11 | Aperture stop | DC | | | |
| 12 | 23.698 | 2.42 | 1.61800 | 63.33 | S-PHM52(OHARA) |
| 13 | −334.617 | 0.50 | | | |
| 14 | 18.468 | 3.17 | 1.49700 | 81.54 | S-FPL51(OHARA) |
| 15* | −57.136 | 3.98 | 1.91082 | 35.25 | TAFD35(HOYA) |
| 16 | 17.034 | 2.09 | | | |
| 17 | 51.290 | 4.05 | 1.92286 | 18.90 | S-NPH2(OHARA) |
| 18 | −333.739 | DD | | | |
| 19 | 11.701 | 4.00 | 1.69680 | 55.53 | S-LAL14(OHARA) |
| 20 | 29.688 | 1.57 | | | |
| 21 | 11.254 | 1.86 | 1.92286 | 18.90 | S-NPH2(OHARA) |
| 22 | 6.481 | 5.38 | | | |
| 23 | 8.379 | 3.98 | 1.49700 | 81.54 | S-FPL51(OHARA) |
| 24 | 37.230 | DE | | | |
| 25 | 0.000 | 1.60 | 1.51633 | 64.10 | Filter or the like |
| 26 | 0.000 | | | | |

In Example 3, variable amounts such as the focal length f of the entire optical system, the F value (F number), the half angle of view ω, the variable distance DA between the first lens unit G1 and the second lens unit G2, the variable distance DB between the second lens unit G2 and the aperture stop AD, the variable distance DC between the aperture stop AD and the third lens unit G3, the variable distance DD between the third lens unit G3 and the fourth lens unit G4, and the variable distance DE between the fourth lens unit G4 and the filter or the like FG are changed according to zooming as listed in the following Table 10.

TABLE 10

| | Short Focal End | Intermediate Focal Length | Long Focal End |
|---|---|---|---|
| f | 5.30 | 23.11 | 99.40 |
| F Number | 1.83 | 2.14 | 2.52 |
| ω | 30.59 | 7.54 | 1.77 |
| DA | 2.1123 | 34.3947 | 52.8712 |
| DB | 54.7426 | 19.9965 | 1.4990 |
| DC | 16.8585 | 7.7708 | 0.2600 |
| DD | 3.0630 | 6.4011 | 12.7254 |
| DE | 5.1831 | 10.9327 | 12.1191 |

When the coefficients of the second-order and fourth-order terms of the phase function are denoted by C2 and C4, respectively, the focal length f3DOE of the diffraction plane is expressed by:

$$f3DOE = -1/(2 \times C2).$$

In Example 3, the coefficient C2 of the second-order term of the phase function of the diffraction plane formed on the 15th surface, that is, the cemented surface between the positive lens L8 and the negative lens L9 is listed in the following Table 11. In addition, the coefficient C4 of the fourth-order term of the phase function is also listed.

TABLE 11

| Coefficient of Phase Function | | |
|---|---|---|
| λ | C2 | C4 |
| 587.6 | −1.98406E−04 | 1.1169E−06 |

Coefficient of Phase Function

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d (C2 \cdot h^2 + C4 \cdot h^4).$$

In the case of Example 3, the values corresponding to the aforementioned condition formulas [1] to [12] are listed in the following Table 12 and satisfy the respective condition formulas [1] to [12].

TABLE 12

| | Condition Formula | | |
|---|---|---|---|
| L2 | $n_d$ | (1) | 1.49700 |
| | $\nu_d$ | (2) | 81.54 |
| | $P_{gF} - (-0.001802 \times \nu_d + 0.6483)$ | (3) | 0.036 |
| L3 | $n_d$ | (1) | 1.59349 |
| | $\nu_d$ | (2) | 67.00 |
| | $P_{gF} - (-0.001802 \times \nu_d + 0.6483)$ | (3) | 0.009 |
| | f3DOE/ft | (4) | 25.35 |
| | f3DOE/fw | (4') | 475.80 |
| | f3DOE/fw | (4") | 58.22 |
| | f1/ft | (5) | 0.79 |
| | f2/ft | (6) | −0.14 |
| | f3/ft | (7) | 0.44 |
| | f4/ft | (8) | 0.28 |
| | D3_4w/fw | (9) | 0.58 |
| | D3_4t/ft | (10) | 0.13 |
| | (b2t/b2w)/(ft/fw) | (11) | 0.48 |
| | m2/TL | (12) | 0.35 |

Figure 10:
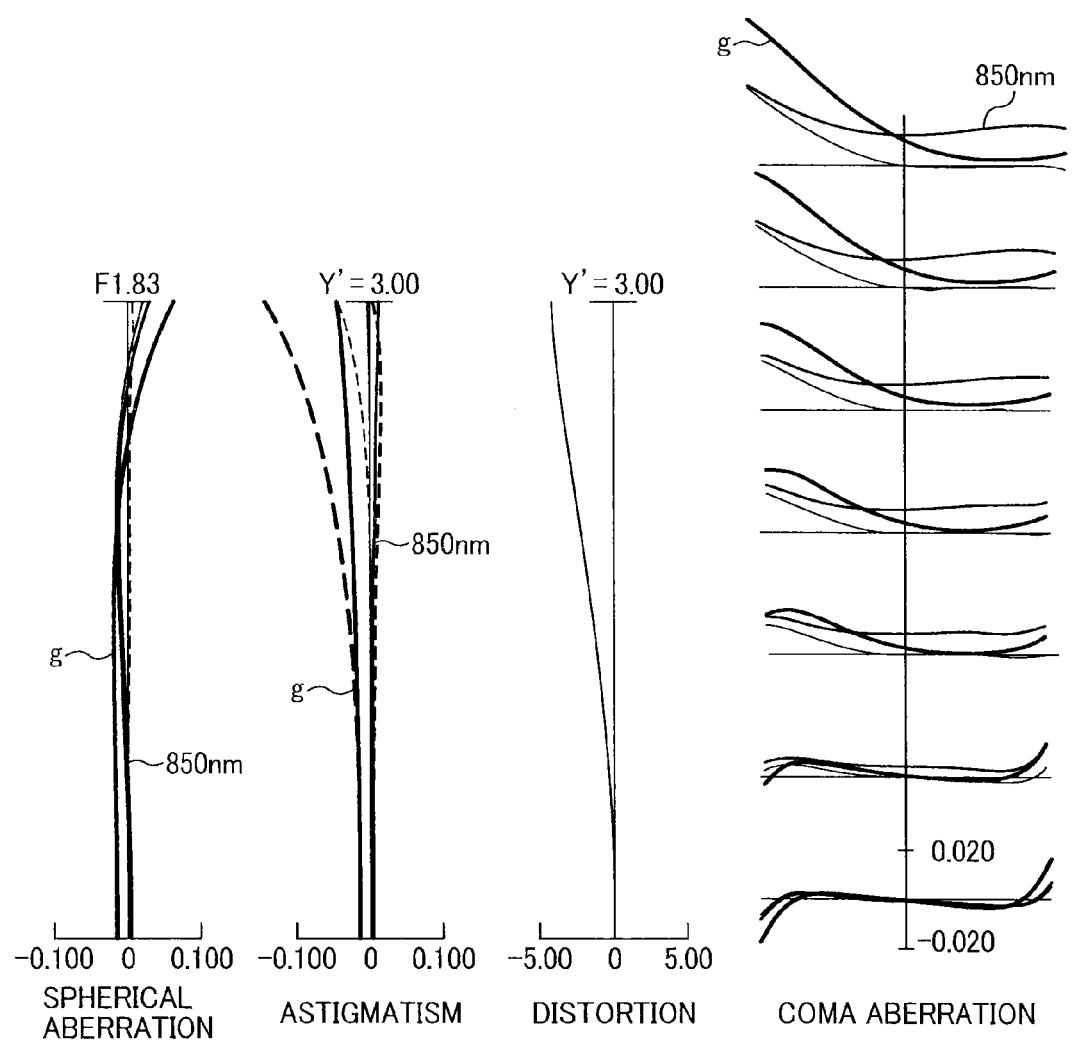
FIG. 10 is an aberration graph illustrating spherical aberration, astigmatism, distortion, and coma aberration at the short focal end of the zoom lens according to Example 3 of the present invention illustrated in FIG. 9.
Figure 11:
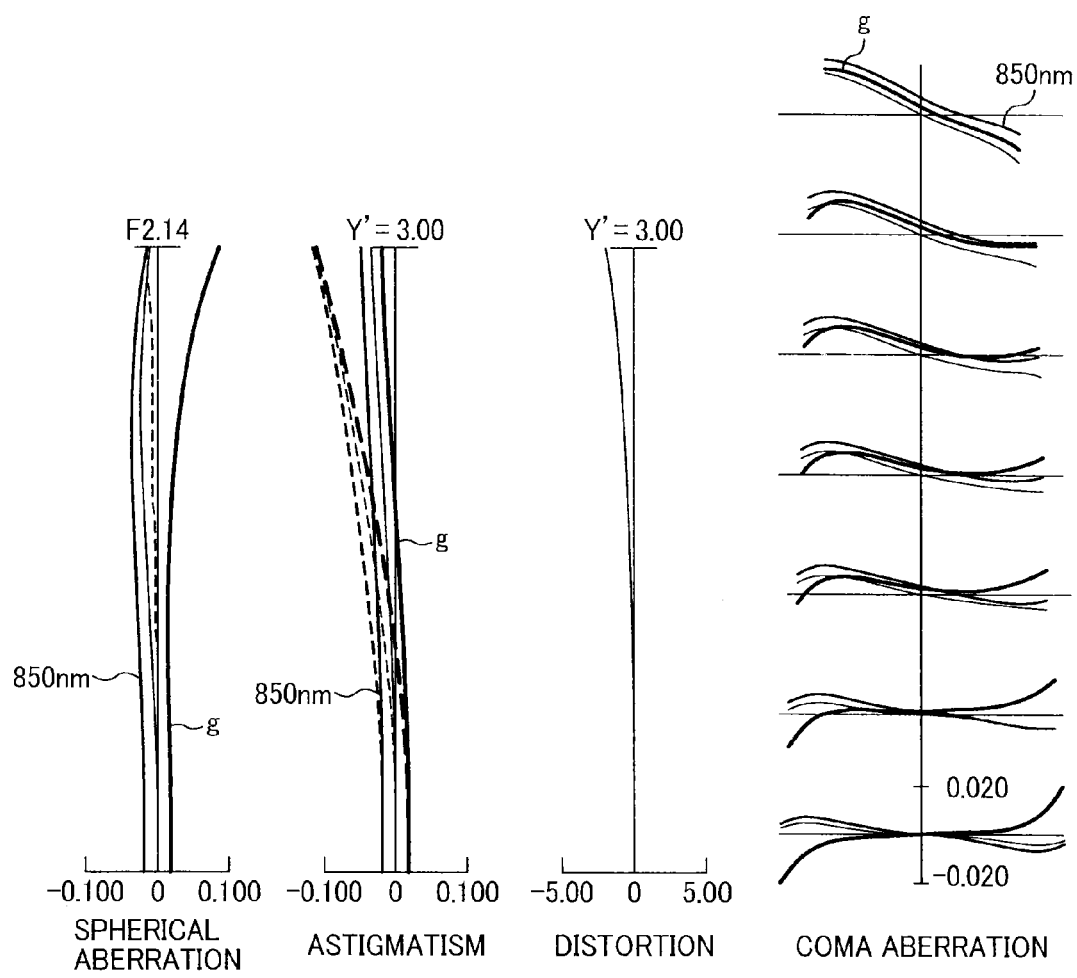
FIG. 11 is an aberration graph illustrating spherical aberration, astigmatism, distortion, and coma aberration at the intermediate focal length of the zoom lens according to Example 3 of the present invention illustrated in FIG. 9.
Figure 12:
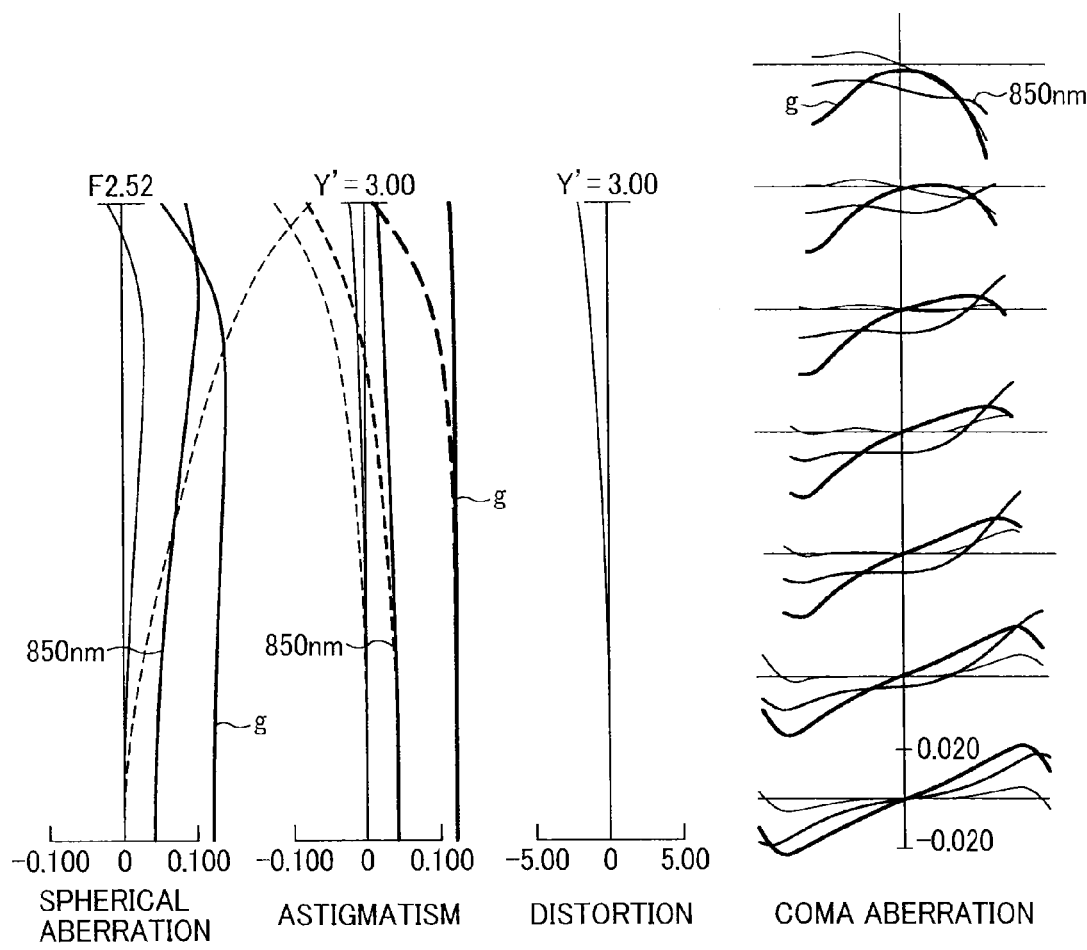
FIG. 12 is an aberration graph illustrating spherical aberration, astigmatism, distortion, and coma aberration at the long focal end of the zoom lens according to Example 3 of the present invention illustrated in FIG. 9.

In addition, FIG. 10, FIG. 11, and FIG. 12 illustrate aberration graphs of spherical aberration, astigmatism, distortion, and coma aberration at the short focal end (wide-angle end), the intermediate focal length, and the long focal end (telephoto end) of Example 3, respectively. In addition, in the aberration graphs, a broken line of the spherical aberration graph indicates a sinusoidal condition; and a solid line and a broken line of the astigmatism graph indicate sagittal and meridional, respectively. These are the same in aberration graphs of other examples.

As obvious from FIGS. 10 to 12, in the zoom lens according to Example 3, the aberrations are sufficiently corrected. Since the example may be adapted to an image receiving element of 2 mega to 5 mega pixels, it is obvious that, if the zoom lens is configured according to Example 3, it is possible to achieve a sufficiently small size and to secure a very excellent imaging performance.

Example 4

Figure 13:
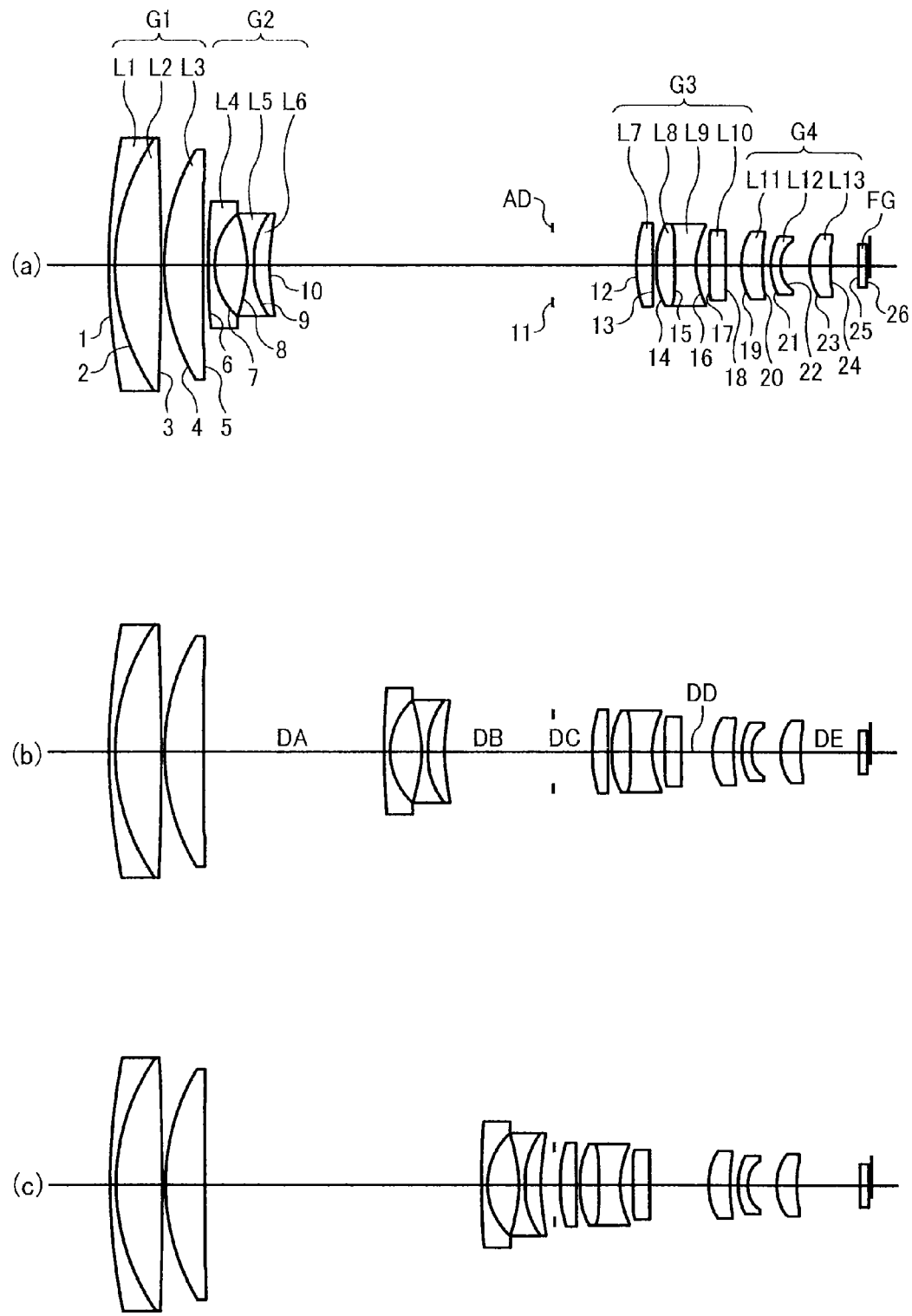
FIG. 13 is a schematic diagram illustrating a configuration of an optical system and a zoom locus involved with zooming of a zoom lens according to Example 4 of a fourth embodiment of the present invention.

FIG. 13 illustrates a lens configuration of an optical system and a zoom locus involved with zooming from a short focal end through a predetermined intermediate focal length to a long focal end according to the zoom lens according to Example 4 of the fourth embodiment of the present invention, FIG. 13(a) is a cross-sectional diagram illustrating the short focal end, that is, a wide-angle end, FIG. 13(b) is a cross-sectional diagram illustrating the predetermined intermediate focal length, and FIG. 13(c) is a cross-sectional diagram illustrating the long focal end, that is, a telephoto end. In addition, in FIGS. 13(a) to 13(c) illustrating the arrangement of the lens unit of Example 4, the left side of the illustration is the object side (subject side).

The zoom lens illustrated in FIGS. 13(a) to 13(c) is configured to include, in order from the object side, a first lens unit G1 having a positive refractive power, a second lens unit G2 having a negative refractive power, a third lens unit G3 having a positive refractive power, and a fourth lens unit G4 having a positive refractive power.

Each unit of the first to fourth lens units G1 to G4 is supported by an appropriate common support frame or the like for each unit, and during the zooming or the like, each unit of the second to fourth lens units G2 to G4 is integrally operated. The aperture stop AD is installed so as to be stationary with respect to the image surface. In FIGS. 13(a) to 13(c), each optical surface is indicated by a surface number.

During change of magnification from the short focal end (wide-angle end) to the long focal end (telephoto end), the first lens unit G1 is stationary, the second lens unit G2 is moved to the image side, the third lens unit G3 is moved to the object side, and the fourth lens unit G4 is moved. Therefore, during change of magnification from the short focal end to the long focal end, the movement is performed so that the distance between the first lens unit G1 and the second lens unit G2 is increased, and the distance between the second lens unit G2 and the third lens unit G3 is decreased.

In the fourth embodiment of the present invention illustrated in FIGS. 13(a) to 13(c), the first lens unit G1 of the zoom lens according to Example (numerical example: hereinafter, the same) 4 is configured to include, in order from the object side, a negative lens L1 which is configured with a negative meniscus lens directing the concave surface toward the image side, a positive lens L2 which is configured with a biconvex lens directing the convex surface having a large curvature from the image side toward the object side, and a positive lens L3 which is configured with a positive meniscus lens directing the convex surface toward the object side.

In addition, the two lenses of the negative lens L1 and the positive lens L2 of the first lens unit G1 are closely adhered to each other to be integrally cemented, so that a two-sheet cemented lens is formed. The second lens unit G2 is configured to include, in order from the object side, a negative lens L4 which is configured with a negative meniscus lens directing the concave surface toward the image side, a negative lens L5 which is configured with a biconcave lens directing the concave surface having a large curvature from the surface of the object side toward the image side, and a positive lens L6 which is configured with a positive meniscus lens directing the convex surface toward the object side. In addition, the two lenses of the positive lens L5 and the negative lens L6 of the second lens unit G2 are closely adhered to each other to be integrally cemented, so that a two-sheet cemented lens is formed.

The third lens unit G3 is configured to include, in order from the object side, a positive lens L7 which is configured with a biconvex lens directing the convex surface having a large curvature from the image side to the object side, a positive lens L8 which is configured with a biconvex lens directing the convex surface having a large curvature from the surface of the image side toward the object side, a negative lens L9 which is configured with a biconcave lens directing the concave surface having a large curvature from the surface of the object side to the image side, and a positive lens L10 which is configured with a biconvex lens directing the convex surface having a large curvature from the surface of the image side toward the object side.

A laminated-type diffraction optical element is configured to be in close contact with the lens surface of the third lens unit G3, in the case of this example, the cemented surface of the positive lens L8 and the negative lens L9.

In addition, the two lenses of the positive lens L8 and the negative lens L9 of the third lens unit G3 are closely adhered to each other to be integrally cemented, so that a two-sheet cemented lens is formed.

The aperture stop AD is retained between the second lens unit G2 and the third lens unit G3 so as to be stationary with respect to the image side. In addition, various filters (not illustrated) such as an ND filter which is configured with a parallel plate may be installed to be adjacent to the aperture stop AD.

The fourth lens unit G4 is configured to include, in order from the object side, a positive lens L11 which is configured with a positive meniscus lens directing the convex surface toward the object side, a negative lens L12 which is configured with a negative meniscus lens directing the concave surface toward the image surface side, and a positive lens L13 which is configured with a positive meniscus lens directing the convex surface toward the object side.

In addition, a filter or the like FG represented as a transparent parallel plate by considering various optical filters or a cover glass (seal glass) for an image-receiving/imaging element such as a CMOS image sensor or a CCD image sensor is arranged at the image surface side of the fourth lens unit G4.

In this case, as illustrated in FIGS. 13(a) to 13(c), during change of magnification from the short focal end to the long focal end, the first lens unit G1 is stationary, the second lens unit G2 is moved to the image side, the third lens unit G3 is moved to the object side, and the fourth lens unit G4 is moved. As a result, the distance between the first lens unit G1 and the second lens unit G2 becomes large, and the distance between the second lens unit G2 and the third lens unit G3 becomes small.

It is preferable that focusing be performed by using the fourth lens unit G4.

In Example 4, the focal length f of the entire optical system, the F number F, and the half angle of view ω are changed by the zooming from the short focal end to the long focal end in the respective ranges of f=5.14~22.29~96.60, F=1.85~2.12~2.43, and ω=31.89~7.84~1.82. Optical characteristics of each optical element are listed in the following Table 13.

TABLE 13

| | R | D | n | ν | Glass |
|---|---|---|---|---|---|
| 1 | 109.892 | 1.20 | 1.88300 | 40.76 | S-LAH58(OHARA) |
| 2 | 40.852 | 9.13 | 1.49700 | 81.54 | S-FPL51(OHARA) |
| 3 | −546.772 | 0.50 | | | |
| 4 | 42.693 | 7.40 | 1.59280 | 68.62 | FCD505(HOYA) |
| 5 | 867.314 | DA | | | |
| 6 | 130.776 | 1.20 | 1.91082 | 35.25 | TAFD35(HOYA) |
| 7 | 12.823 | 6.00 | | | |
| 8 | −30.017 | 1.20 | 1.49700 | 81.54 | S-FPL51(OHARA) |
| 9 | 17.063 | 3.22 | 1.92286 | 20.88 | EFDS1(HOYA) |
| 10 | 55.342 | DB | | | |
| 11 | Aperture stop | DC | | | |
| 12 | 26.100 | 3.09 | 1.61800 | 63.33 | S-PHM52(OHARA) |
| 13 | −214.566 | 0.58 | | | |
| 14 | 17.860 | 3.72 | 1.49700 | 81.54 | S-FPL51(OHARA) |
| 15* | −57.152 | 4.00 | 1.91082 | 35.25 | TAFD35(HOYA) |
| 16 | 17.464 | 2.34 | | | |
| 17 | 75.430 | 3.15 | 1.92286 | 20.88 | EFDS1(HOYA) |
| 18 | −126.325 | DD | | | |
| 19 | 11.881 | 4.00 | 1.67790 | 55.34 | S-LAL12(OHARA) |
| 20 | 28.371 | 1.68 | | | |

TABLE 13-continued

|    | R      | D    | n       | ν     | Glass           |
|----|--------|------|---------|-------|-----------------|
| 21 | 11.236 | 1.90 | 1.92286 | 18.90 | S-NPH2(OHARA)   |
| 22 | 6.718  | 5.31 |         |       |                 |
| 23 | 9.125  | 3.97 | 1.49700 | 81.54 | S-FPL51(OHARA)  |
| 24 | 48.734 | DE   |         |       |                 |
| 25 | 0.000  | 1.60 | 1.51633 | 64.10 | Filter or the like |
| 26 | 0.000  |      |         |       |                 |

In Example 4, variable amounts such as the focal length f of the entire optical system, the F value (F number), the half angle of view ω, the variable distance DA between the first lens unit G1 and the second lens unit G2, the variable distance DB between the second lens unit G2 and the aperture stop AD, the variable distance DC between the aperture stop AD and the third lens unit G3, the variable distance DD between the third lens unit G3 and the fourth lens unit G4, and the variable distance DE between the fourth lens unit G4 and the filter or the like FG are changed according to zooming as listed in the following Table 14.

TABLE 14

|          | Short Focal End | Intermediate Focal Length | Long Focal End |
|----------|-----------------|---------------------------|----------------|
| f        | 5.14            | 22.29                     | 96.60          |
| F Number | 1.85            | 2.12                      | 2.43           |
| ω        | 31.89           | 7.84                      | 1.82           |
| DA       | 1.00            | 34.1479                   | 52.4214        |
| DB       | 54.0276         | 20.8715                   | 2.5295         |
| DC       | 15.8244         | 7.2596                    | 1.0000         |
| DD       | 3.0000          | 5.8911                    | 11.1403        |
| DE       | 5.4227          | 11.0964                   | 12.1068        |

When the coefficients of the second-order and fourth-order terms of the phase function are denoted by C2 and C4, respectively, the focal length f3DOE of the diffraction plane is expressed by:

$$f3DOE = -1/(2 \times C2).$$

In Example 4, the coefficient C2 of the second-order term of the phase function of the diffraction plane formed on the 15th surface, that is, the cemented surface between the positive lens L8 and the negative lens L9 is listed in the following Table 15. In addition, the coefficient C4 of the fourth-order term of the phase function is also listed.

TABLE 15

| Coefficient of Phase Function | | |
|---|---|---|
| λ | C2 | C4 |
| 15 | 587.6 | −1.44785E−04 | 1.12152E−06 |

Coefficient of Phase Function

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d (C2 \cdot h^2 + C4 \cdot h^4).$$

In the case of Example 4, the values corresponding to the aforementioned condition formulas [1] to [12] are listed in the following Table 16 and satisfy the respective condition formulas [11] to [12].

TABLE 16

| | Condition Formula | | |
|---|---|---|---|
| L2 | $n_d$ | (1) | 1.49700 |
|    | $v_d$ | (2) | 81.54 |
|    | $P_{gF} - (-0.001802 \times v_d + 0.6483)$ | (3) | 0.036 |
| L3 | $n_d$ | (1) | 1.59282 |
|    | $v_d$ | (2) | 68.62 |
|    | $P_{gF} - (-0.001802 \times v_d + 0.6483)$ | (3) | 0.019 |
|    | f3DOE/ft | (4) | 35.75 |
|    | f3DOE/fw | (4') | 672.23 |
|    | f3DOE/fw | (4") | 79.79 |
|    | f1/ft | (5) | 0.81 |
|    | f2/ft | (6) | −0.14 |
|    | f3/ft | (7) | 0.45 |
|    | f4/ft | (8) | 0.28 |
|    | D3_4w/fw | (9) | 0.58 |
|    | D3_4t/ft | (10) | 0.12 |
|    | (b2t/b2w)/(ft/fw) | (11) | 0.50 |
|    | m2/TL | (12) | 0.35 |

Figure 14:
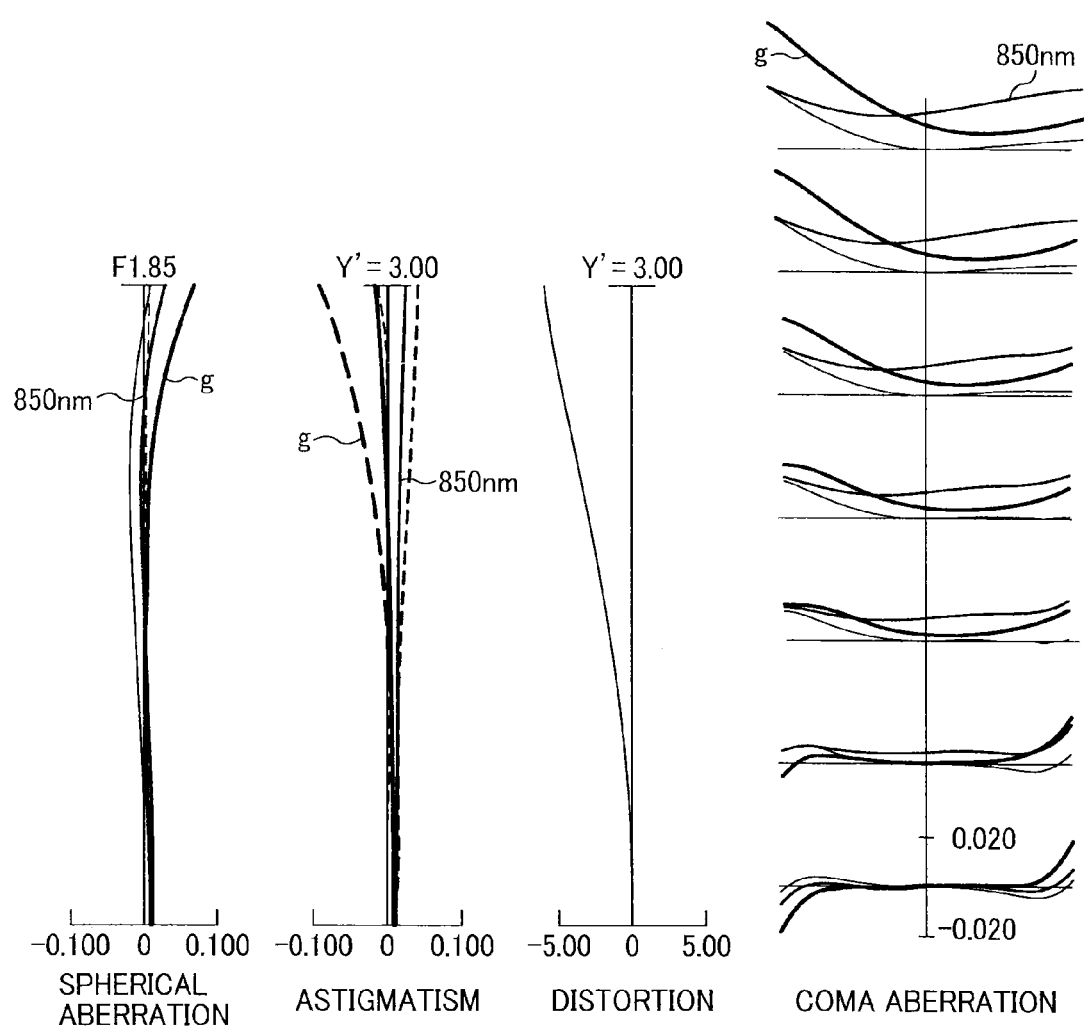
FIG. 14 is an aberration graph illustrating spherical aberration, astigmatism, distortion, and coma aberration at the short focal end of the zoom lens according to Example 4 of the present invention illustrated in FIG. 13.
Figure 15:
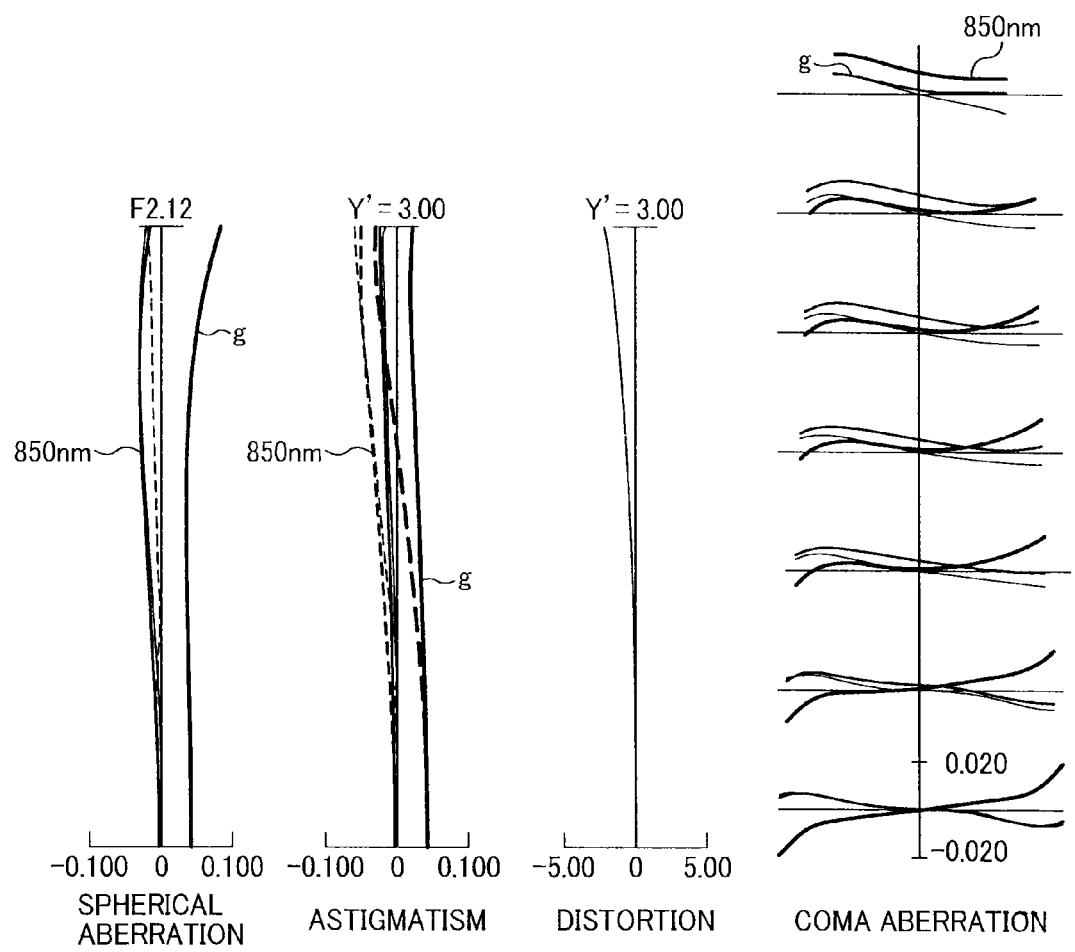
FIG. 15 is an aberration graph illustrating spherical aberration, astigmatism, distortion, and coma aberration at the intermediate focal length of the zoom lens according to Example 4 of the present invention illustrated in FIG. 13.
Figure 16:
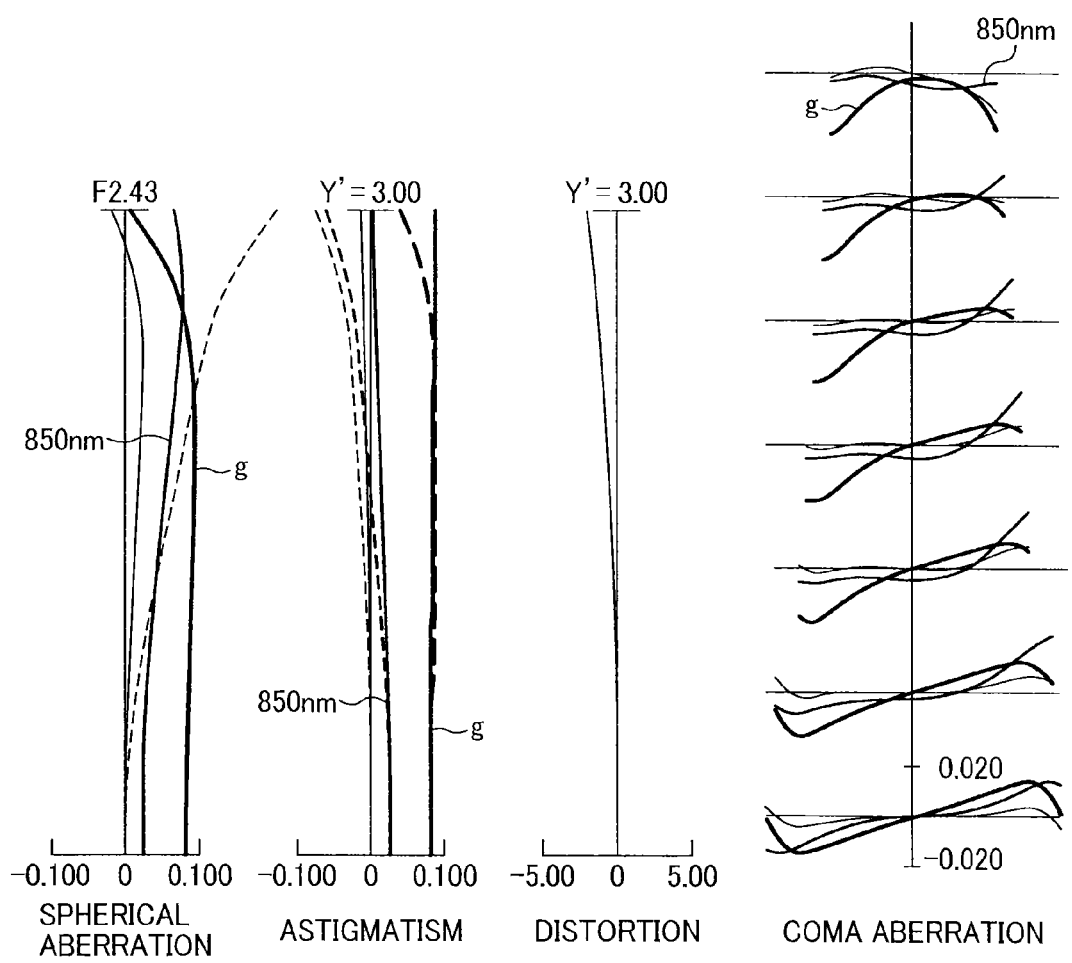
FIG. 16 is an aberration graph illustrating spherical aberration, astigmatism, distortion, and coma aberration at the long focal end of the zoom lens according to Example 4 of the present invention illustrated in FIG. 13.

In addition, FIG. 14, FIG. 15, and FIG. 16 illustrate aberration graphs of spherical aberration, astigmatism, distortion, and coma aberration at the short focal end (wide-angle end), the intermediate focal length, and the long focal end (telephoto end) of Example 4, respectively. In addition, in the aberration graphs, a broken line of the spherical aberration graph indicates a sinusoidal condition; and a solid line and a broken line of the astigmatism graph indicate sagittal and meridional, respectively. These are the same in aberration graphs of other examples.

As obvious from FIGS. 14 to 16, in the zoom lens according to Example 4, the aberrations are sufficiently corrected. Since the example may be adapted to an image receiving element of 2 mega to 5 mega pixels, it is obvious that, if the zoom lens is configured according to Example 4, it is possible to achieve a sufficiently small size and to secure a very excellent imaging performance.

Fifth Embodiment

Figure 17:
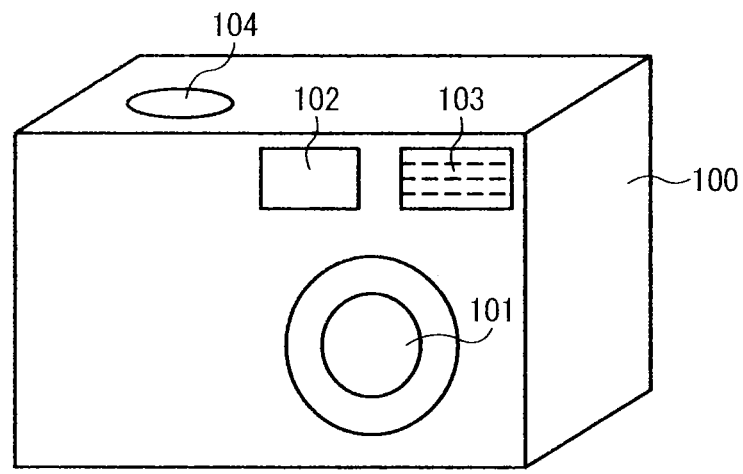
FIG. 17 is a perspective view schematically illustrating a configuration of outer appearance of a digital camera as a camera according to a fifth embodiment of the present invention as viewed from an object side.
Figure 18:
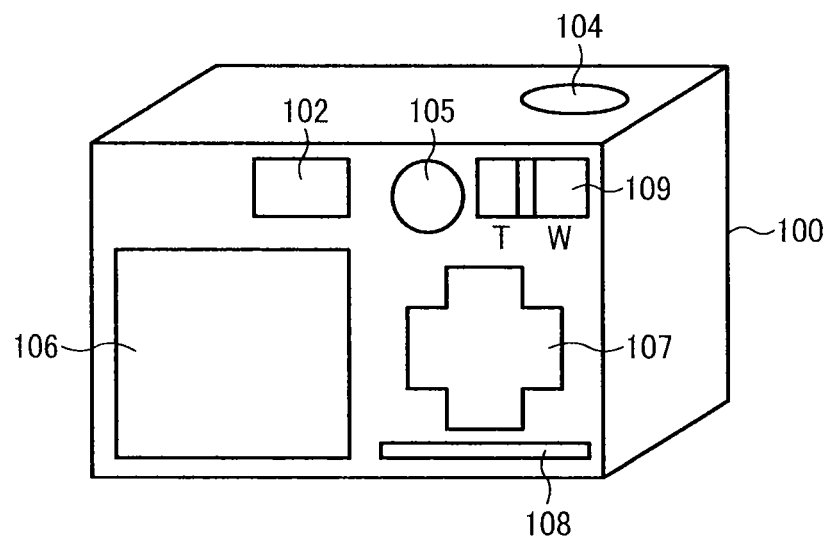
FIG. 18 is a perspective view schematically illustrating a configuration of outer appearance of the digital camera of FIG. 17 according to the fifth embodiment of the present invention as viewed from a photographer's side.
Figure 19:
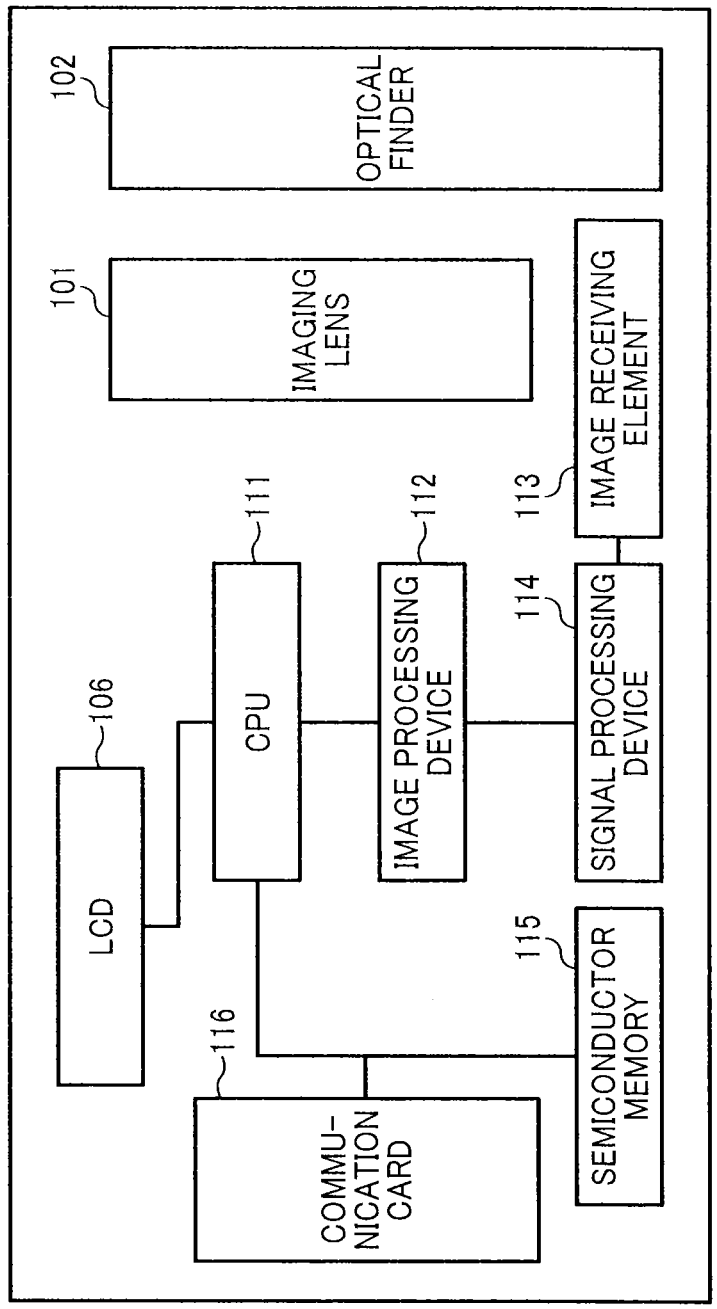
FIG. 19 is a block diagram illustrating a configuration of functions of the digital camera of FIGS. 17 and 18 according to the fifth embodiment of the present invention.

Next, a camera according to a fifth embodiment of the present invention where a zoom lens such as the above-described zoom lenses of the first to fourth embodiment of the present invention is employed as a photographing optical system or a moving picture photographing optical system will be described with reference to FIGS. 17 to 19. FIG. 17 is a perspective view schematically illustrating a configuration of outer appearance of a digital camera as a camera according to the fifth embodiment of the present invention as viewed from an object side. FIG. 18 is a perspective view schematically illustrating a configuration of outer appearance of the digital camera as viewed from a photographer's side. In addition, FIG. 19 is a block diagram illustrating a configuration of functions of the digital camera. In FIGS. 17 to 19, although a digital camera is described as a camera, any desired apparatus may incorporate the above-described zoom lens. Examples of such apparatus include, but not limited to, any other imaging device dedicated for imaging including a video camera that photographs a moving picture and a traditional film camera with a so-call silver halide film. The other examples include various information devices including a portable information terminal such as any desired PDA (personal data assistant) like a mobile phone, smart phone or tablet, provided with an imaging function corresponding to the digital camera or the like.

Such an information device also includes substantially the same function configuration as the digital camera having a slightly different outer appearance, so that the above-described zoom lenses according to the first to fourth embodiments of the present invention may be used as an imaging optical system of the information device.

As illustrated in FIGS. 17 and 18, the digital camera is configured so that a camera body 100 is equipped with an imaging lens (photographing lens) 101, an optical finder 102, a strobe (electronic flash light) 103, a shutter button 104, a power switch 105, an LCD 106, a manipulation button 107, a memory card slot 108, a zoom switch 109, and the like. As illustrated in FIG. 19, the digital camera further includes a central processing unit (CPU) 111, an image processing device 112, an image receiving element 113, a signal processing device 114, a semiconductor memory 115, and a communication card 116.

In this example, the digital camera includes the imaging lens 101 as an imaging optical system, and the image receiving element 113 as an image sensor. The image receiving element 113 may be implemented by a CMOS (complementary metal oxide semiconductor) imaging element, a CCD (charge coupled device) imaging element, or the like to read an optical image of a subject focused by the imaging lens 101. The zoom lenses according to the first to fourth embodiments of the present invention may be used as the imaging lens 101.

The image receiving element 113 outputs an image signal, which is processed by the signal processing device 114 under control of the CPU 111 that converts the image signal to digital image information. Under control of the CPU 111, the image processing device 112 applies image processing to the digitalized image information. The image information is then stored in the semiconductor memory 115 such as a nonvolatile memory. In this case, the semiconductor memory 115 may be a memory card which is inserted into the memory card slot 108 or a built-in semiconductor memory mounted on a board of the main body of the digital camera. A mid-photographing image may be displayed on the LCD 106, or an image recorded in the semiconductor memory 115 may be displayed on the LCD 106. In addition, the image recorded in the semiconductor memory 115 may be transmitted to an external apparatus through the communication card 116 inserted into a communication card slot (although it is not clearly illustrated, it may also be used as the memory card slot 108).

The imaging lens 101 is configured so that, during the time of carrying the camera, an object surface thereof is covered with a lens barrier, and if a user turns on the camera by manipulating the power switch 105, the lens barrier is opened so as to expose the object surface. At this time, inside a barrel of the imaging lens 101, optical systems of lens units of the zoom lens are arranged, for example, at the short focal end (wide-angle end), and by manipulating the zoom switch 109, the arrangement of each lens unit of the optical systems are changed, so that the operation of changing magnification through the intermediate focal length to the long focal end (telephoto end) may be performed.

In addition, it is preferable that an optical system of the optical finder 102 also perform changing magnification in cooperation with a change of an angle of view of the imaging lens 101.

In many cases, focusing is performed by half push manipulation of the shutter button 104.

The focusing of the zoom lenses according to the first to fourth embodiments of the present invention may be performed by movement of a portion of lens units of the optical systems of plural lens units constituting the zoom lens. If the shutter button 104 is further pushed into a full pushed state, photographing is performed, and after that, the above-described processes are performed.

In order to display the image stored in the semiconductor memory 115 on the LCD 106 or to transmit the image through the communication card 116 to the external apparatus, the manipulation button 107 is manipulated in a predetermined manner. The semiconductor memory 115 and the communication card 116 may be used in a state of being inserted into dedicated or general-purpose slot such as the memory card slot 108 and the communication card slot.

When the imaging lens 101 is in a retracted state, each lens unit functioning as the focusing lens may not be necessarily provided on the optical axis. For example, if the digital camera is configured with a mechanism where, at the retracting time, at least one of the second lens unit G2 and the third lens unit G3 is retracted from the optical axis and is accommodated together with other lens units, it is possible to implement a new thin configuration of the digital camera.

As described above, in the information device having the same imaging device or the same imaging function as the above-described digital camera (camera), the imaging lens 101 which is configured by using the same zoom lenses of the first to fourth embodiments (Examples 1 to 4) may be used as a photographing optical system. Therefore, it is possible to implement an information device such as a portable information terminal device having the same imaging device or the same imaging function as a small-sized, high-image-quality digital camera using image receiving elements of 2 mega to 5 mega pixels or more.

In addition, the configurations of the zoom lenses according to the first to fourth embodiments of the present invention may also be applied to a photographing lens of a traditional silver halide film camera or a projection lens of a projector.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A zoom lens comprising, in order from an object side toward an image side:
   a first lens unit having a positive refractive power and provided with a positive lens;
   a second lens unit having a negative refractive power;
   a third lens unit having a positive refractive power and provided with a diffraction plane of a diffraction optical element;
   a fourth lens unit having a positive refractive power and configured to perform focusing; and
   an aperture stop installed between the second lens unit and the third lens unit,
   wherein, according to a change of magnification from a short focal end to a long focal end, the first lens unit is stationary, the second lens unit is moved to the image side, the third lens unit is moved to the object side, and the fourth lens unit is moved, and
   wherein the positive lens of the first lens unit satisfies the following condition formulas:

$$1.45 < n_d < 1.65; \quad [1]$$

$$60.0 < v_d < 95.0; \text{ and} \quad [2]$$

$$0.005 < P_{g,F} - (-0.001802 \times v_d + 0.6483) < 0.050, \quad [3]$$

in which, $n_d$ denotes a refractive index of a material of the positive lens, $v_d$ denotes an Abbe number of the material of the positive lens, and $P_{g,F}$ denotes a partial dispersion ratio of the material of the positive lens, which is expressed by: $P_{g,F}=(n_g-n_F)/(n_F-n_C)$, with $n_F$, $n_C$, and $n_g$ denoting refractive indexes of F-line, C-line, and g-line of the material of the positive lens, respectively, and the partial dispersion ratio $P_{g,F}$.

2. The zoom lens according to claim 1, wherein, the third lens unit satisfies the following condition formula:

$$10 < f3DOE/f_T < 50, \quad [4]$$

in which $f_T$ denotes a focal length of the entire system at the long focal end, and f3DOE denotes a focal length of the diffraction plane of the diffraction optical element included in the third lens unit.

3. The zoom lens according to claim 1, wherein the positive lens of the first lens unit includes at least two positive lenses, each of which satisfies the conditional formulas:

$$1.45 < n_d < 1.65; \quad [1]$$

$$60.0 < v_d < 95.0; \quad [2]$$

and $$0.005 < P_{g,F} - (-0.001802 \times v_d + 0.6483) < 0.050. \quad [3]$$

4. The zoom lens according to claim 1, wherein, during the change of magnification from the short focal end to the long focal end, the aperture stop is stationary with respect to an image surface.

5. The zoom lens according to claim 1, wherein, the zoom lens satisfies the following condition formulas:

$$0.70 < f1/ft < 0.90; \quad [5]$$

$$-0.25 < f2/ft < -0.05; \quad [6]$$

$$0.35 < f3/f1 < 0.55; \text{ and} \quad [7]$$

$$0.20 < f4/ft < 0.40, \quad [8]$$

in which f1 denotes a focal length of the first lens unit, f2 denotes a focal length of the second lens unit, f3 denotes a focal length of the third lens unit, f4 denotes a focal length of the fourth lens unit, and ft denotes a focal length of the entire system at the long focal end.

6. The zoom lens according to claim 1, wherein the zoom lens further satisfies the following condition formulas:

$$0.5 < D3\_4w/fw < 0.7; \text{ and} \quad [9]$$

$$0.05 < D3\_4t/ft < 0.25, \quad [10]$$

in which fw denotes a focal length of the entire system at the short focal end, ft denotes a focal length of the entire system at the long focal end, D3_4w denotes a distance between the third lens unit and the fourth lens unit at the short focal end, and D3_4t denotes a distance between the third lens unit and the fourth lens unit at the long focal end.

7. The zoom lens according to claim 1, wherein the zoom lens satisfies the following condition formula:

$$0.4 < (b2t/b2w)/(ft/fw) < 0.6, \quad [11]$$

in which b2w denotes a lateral magnification of the second lens unit at the short focal b2t denotes a lateral magnification of the second lens unit at the long focal end, fw denotes a focal length of the entire system at the short focal end, and ft denotes a focal length of the entire system at the long focal end.

8. The zoom lens according to claim 1, wherein the zoom lens satisfies the following condition formula:

$$0.3 < m2/TL < 0.4, \quad [12]$$

in which m2 denotes an amount of movement of the second lens unit during the change of magnification from the short focal end to the long focal end, and TL denotes a total length of the lens.

9. A device comprising the zoom lens according to claim 1 as a photographing optical system.

10. The device of claim 9, wherein the device includes a camera.

11. The device of claim 9, wherein the device includes an information terminal device.

* * * * *